US 9,852,057 B2

(12) United States Patent
Daghighian et al.

(10) Patent No.: US 9,852,057 B2
(45) Date of Patent: Dec. 26, 2017

(54) LIGHT-WEIGHT ON-CHIP SIGNAL MONITOR WITH INTEGRATED MEMORY MANAGEMENT AND DATA COLLECTION

(71) Applicant: Finisar Corporation, Sunnyvale, CA (US)

(72) Inventors: Henry Meyer Daghighian, Redwood City, CA (US); Lucy G. Hosking, Santa Cruz, CA (US); Gilles P. Denoyer, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 364 days.

(21) Appl. No.: 14/748,469

(22) Filed: Jun. 24, 2015

(65) Prior Publication Data

US 2016/0378132 A1  Dec. 29, 2016

(51) Int. Cl.
*H04B 10/079* (2013.01)
*G06F 12/02* (2006.01)
*H04B 10/40* (2013.01)
*G06F 11/34* (2006.01)
*G06F 13/16* (2006.01)

(52) U.S. Cl.
CPC .......... *G06F 12/023* (2013.01); *G06F 11/349* (2013.01); *G06F 13/16* (2013.01); *H04B 10/40* (2013.01); *H04B 10/07953* (2013.01)

(58) Field of Classification Search
CPC ...... H04B 10/07953; H04B 3/46; H04L 1/203
See application file for complete search history.

(56) References Cited

U.S. PATENT DOCUMENTS

2004/0091261 A1* 5/2004 Grau ................... H04B 10/079
398/33
2015/0358090 A1* 12/2015 Mactaggart ........ G01R 31/3171
375/224

* cited by examiner

*Primary Examiner* — Jaweed A Abbaszadeh
*Assistant Examiner* — Alyaa T Mazyad
(74) *Attorney, Agent, or Firm* — Maschoff Brennan

(57) ABSTRACT

Embodiments of a device and method to automatically acquire signal quality metrics in a digital communication system are disclosed. The device may include acquisition means to sample the likelihood of a digital communication signal passing through a grid of time and amplitude regions, and storage means by which such likelihood measurements may be accumulated in a computer memory array for analysis. A state machine may execute a method that controls both the acquisition means and the storage means, requiring minimal intervention from supervisory systems.

25 Claims, 14 Drawing Sheets

LIGHT-WEIGHT ON-CHIP SIGNAL MONITOR WITH INTEGRATED MEMORY MANAGEMENT AND DATA COLLECTION

FIELD

Some embodiments described herein generally relate to monitoring signal quality on a chip.

BACKGROUND

Unless otherwise indicated herein, the materials described herein are not prior art to the claims in the present application and are not admitted to be prior art by inclusion in this section.

Existing technologies may use internal bit error rate test (BERT) and pattern generator systems to monitor eye diagrams. The BERT and pattern generator systems may consume a large amount of power and integrated circuit (IC) space. The BERT and pattern generator systems may need significant host intervention with a transceiver, and may not be amenable to efficient and simple firmware implementations to allow usage within the transceiver for a variety of functions. The BERT and pattern generator systems may be very slow and may take hours to acquire an image of an eye diagram.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to monitoring signal quality on a chip.

In an example embodiment, an on-chip signal monitor may include a clock and data recovery (CDR) unit that may provide a reference clock signal. The signal monitor may include a state machine that may include a sequencing logic. The sequencing logic may be configured to set a sample gate signal to a first level to initiate each sample acquisition. The sequencing logic may be configured to trigger an update of at least one of a digitized time value or a digitized amplitude value. The signal monitor may include a trigger flip flop that may connect to the CDR unit to receive the reference clock signal and the sequencing logic to receive the sample gate signal. The trigger flip flop may be configured to pass a rising edge of the reference clock signal to an input of a programmable delay chain responsive to the sample gate signal being set to the first level. The signal monitor may include the programmable delay chain that may receive the digitized time value and may output a delayed rising edge to a sample capture unit at a time slice window determined by the digitized time value. The signal monitor may include the sample capture unit that, responsive to the delayed rising edge, may capture a sample from an input signal within the time slice window and an amplitude slice window determined by the digitized amplitude value. The signal monitor may include an address generator that may use the digitized time value and the digitized amplitude value to form an address of an accumulator register located in a memory. The signal monitor may include a load-increment-store logic that may fetch a value of the accumulator register from the address of the memory, increment the value by 1, and store the incremented value in the address.

In another example embodiment, a method of acquiring samples using an automatic signal monitor may include setting a sample gate signal to a first level to initiate sample acquisition. The method may include capturing an input signal over a time slice window to output an average voltage of the input signal in the time slice window. The time slice window may be determined by a digitized time value stored in a counter. The method may include digitizing the average voltage of the input signal to a digitized amplitude value. The method may include forming an address of an accumulator register based on the digitized time value and the digitized amplitude value. The method may include fetching a value stored in the accumulator register using the address. The method may include incrementing the value by 1. The method may include storing the value in the accumulator register.

In yet another example embodiment, a method of acquiring samples using an automatic signal monitor may include setting a sample gate signal to a first level to initiate sample acquisition. The method may include capturing a sample within a time slice window determined by a digitized time value and an amplitude slice window determined by a digitized amplitude value. The digitized time value and the digitized amplitude value may be stored in a counter. The method may include generating a sample-in-window signal with a trigger level to trigger an update of an accumulator register determined by the digitized time value and the digitized amplitude value. The method may include forming an address of the accumulator register based on the digitized time value and the digitized amplitude value. The method may include fetching a value stored in the accumulator register using the address. The method may include incrementing the value by 1. The method may include storing the value in the accumulator register.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
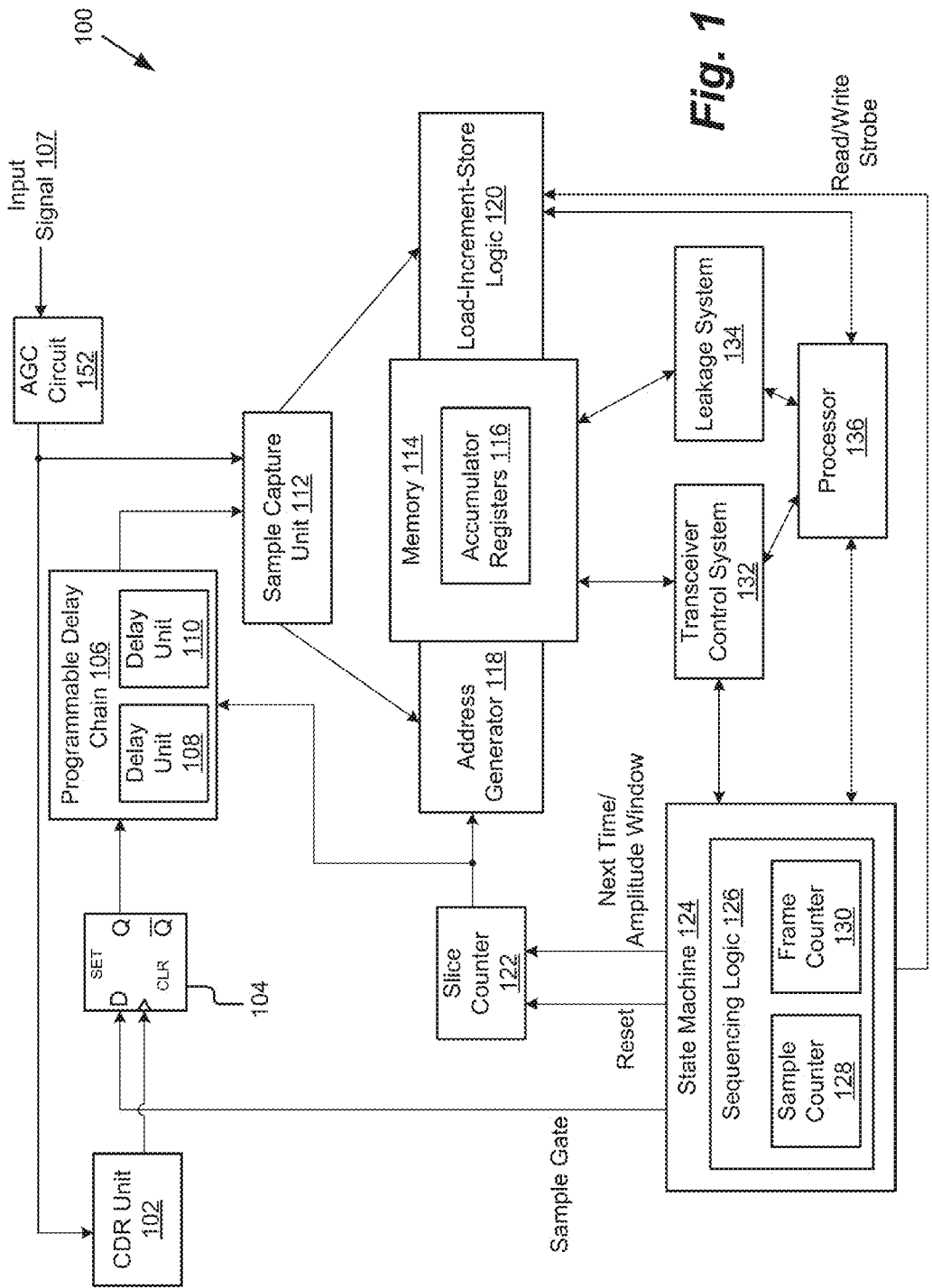
FIG. 1 is a block diagram that illustrates an example on-chip signal monitor.

Embodiments described herein generally relate to monitoring signal quality on a chip.

Some embodiments described herein may include an automated light-weight on-chip signal monitor with integrated memory management and data collection for use in fiber-optics transceivers. The signal monitor may be implemented on a system chip of a transmitter, a receiver, or a transceiver to measure signal characteristics at certain points in a signal path. In a receiver, the signal monitor may be placed in front of a data retimer and slicer. In a transmitter, the signal monitor may be placed after the transmitter's input equalization and pre-emphasis circuitry, and may be used to adjust the transmitter's input equalization. Alternatively or additionally, the signal monitor may be associated with a monitor diode to analyze a laser's optical output and adjust wave shaping controls.

The signal monitor may be referred to as a light-weight on-chip digital communications analyzer that may provide and analyze eye diagrams. The signal monitor may also be referred to as an on-chip eye monitor that may provide eye quality metrics.

The signal monitor may operate faster, consume less power, and have a smaller IC footprint than existing BERT and pattern generator systems. For example, the signal monitor may track an eye shape or eye shape updates in milliseconds. The signal monitor may provide feedback and/or eye quality metrics for dynamic tracking in adaptive electronic dispersion compensation (EDC) receivers, transmitter input equalization, dynamic laser wave shaping, closed loop modulation control, and/or other functions in multiple channels simultaneously. For example, the signal monitor may provide the feedback and/or eye quality metrics for slice level adjustments to a detector (e.g., a pulse-amplitude modulation (PAM) detector), EDC equalizers, and diagnostic that may be included in advanced digital optical monitoring systems.

The signal monitor may be configured for various modulation schemes including, but not limited to, PAM (e.g., PAM-2, PAM-4), carrier-less amplitude phase (CAP) modulation, orthogonal frequency-division multiplexing (OFDM), and/or other modulation schemes. The signal monitor may adjust resolutions for time slice windows and amplitude slice windows as well as other related components to accommodate the different modulation schemes.

For example, for a PAM-4 modulated signal, the signal monitor may include 16 levels of amplitude measurement across amplitude limits of the signal (e.g., 16 amplitude slice windows) and 16 levels of time measurement across a bit interval (e.g., 16 time slice windows). A 16×16 array of accumulator registers may be used to count numbers of samples acquired by the signal monitor, with each accumulator register counting a number of samples acquired within a corresponding amplitude slice window and a corresponding time slice window. Each accumulator register may have a size of 8 to 16 bits or another suitable size with a different number of bits.

Each sample of a signal acquired by the signal monitor may fall within a corresponding amplitude slice window and a corresponding time slice window, and may be referred to as an amplitude-time sample.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1 is a block diagram that illustrates an example on-chip signal monitor 100, arranged in accordance with at least some embodiments described herein. The signal monitor 100 may include a clock and data recovery (CDR) unit 102, a trigger flip flop 104, a programmable delay chain 106 that may include, for example, a programmable phase rotator, a sample capture unit 112, a memory 114, an address generator 118, a load-increment-store logic 120, a slice counter 122, a state machine 124, a transceiver control system 132, a leakage system 134, a processor 136, and other components suitable for a signal monitor. Components of the signal monitor 100 may be coupled to each other (e.g., as illustrated in FIG. 1) to implement functionality of the signal monitor 100.

The CDR unit 102 may be locked to an incoming data rate. Even in a case of a distorted signal with a collapsed eye in an eye diagram, the CDR unit 102 may be locked to main frequency components of an incoming data signal and may provide at least a phase reference to the incoming data signal. In some embodiments, the CDR unit 102 may be configured to provide a sub-rate reference clock signal at ½" of the incoming data rate. A value of "n" may be adjustable and may be selected for a relationship of approximately one cycle per data acquisition cycle of the state machine 124 or another suitable relationship.

Operations of the signal monitor 100 may be controlled by the state machine 124. The state machine 124 may manage acquisition of samples and may control interfaces with the transceiver control system 132, the leakage system 134, or other suitable systems not shown in FIG. 1. The state machine 124 may access accumulator registers 116 and configuration registers (not shown in FIG. 1) in the memory 114 via a memory bus. In some embodiments, access to the memory 114 by the state machine 124 may be multiplexed or interleaved with access to the memory 114 by the transceiver control system 132 so that the state machine's 124 access to the memory 114 may not interfere with the transceiver control system's 132 access to the memory 114. The transceiver control system 132 may read or write the accumulator registers 116 and/or configuration registers with no regard to the state machine's 124 activity.

The state machine 124 may be operated in accordance with a clock signal that may have a frequency lower than the reference clock signal from the CDR unit 102. The clock signal may include a system clock signal in the neighborhood of 40 MHz from a microcontroller (e.g., a proprietary microcontroller or another suitable microcontroller). Alternatively, the state machine 124 may include its own clock oscillator that operates in its own frequency. The state machine 124 may consume relatively insignificant power compared to components that operate in a faster speed. In some embodiments, the state machine 124 may include a sequencing logic 126, a saturating conditional incrementer register (not shown in FIG. 1), and other registers or components.

The sequencing logic 126 may be configured to manage acquisition of samples in the signal monitor 100. For example, the sequencing logic 126 may raise a sample gate signal (e.g., setting the sample gate signal to 1) to initiate each sample acquisition process. The sequencing logic 126 may set the sample gate signal to 0 when each sample acquisition process completes. The sequencing logic 126 may feed the sample gate signal to the trigger flip flop 104.

The sequencing logic 126 may reset the slice counter 122 to an initial state by setting a reset signal to 1. The sequencing logic 126 may also trigger the slice counter 122 to update a value stored in the slice counter 122 before, during, or after each sample acquisition. For example, the sequencing logic 126 may raise a next-time/amplitude-window signal (e.g., setting the next-time/amplitude-window signal to 1), to cause the slice counter 122 to increment its value by 1. The value stored in the slice counter 122 may represent a digitized time value and/or a digitized amplitude value. The digitized time value may determine a time slice window for acquiring the sample, while the digitized amplitude value may determine an amplitude slice window for acquiring the sample. Thus, an update of the value in the slice counter 122 may cause a time slice window to move to a next time slice window, an amplitude slice window to move to a next amplitude slice window, or both.

In some embodiments, the value stored in the slice counter 122 may be represented by a group of bits. A first sub-group of bits from the group may represent the digitized time value, and a second sub-group of bits from the group may represent the digitized amplitude value. Alternatively, the group of bits may represent the digitized time value only.

In some embodiments, the sequencing logic 126 may include a sample counter 128, a frame counter 130, and other suitable components. The sample counter 128 may be configured to count a number of samples collected in a selected time slice window. Alternatively, the sample counter 128 may be configured to count a number of samples collected in a selected time slice window and a selected amplitude slice window.

After a predetermined number of samples have been collected in the selected time slice window (or in the selected time slice window and the selected amplitude window), the sequencing logic 126 may set a maskable interrupt flag that may indicate completion of sample acquisition in the selected time slice window (or in the selected time slice window and the selected amplitude window). A value for the predetermined number may be stored in a configuration register in the memory 114. In response to the setting of the maskable interrupt flag, the sequencing logic 126 may stop sample acquisition or may continue to acquire samples in a next time slice window and/or a next amplitude slice window based on a bit stored in a sample configuration register. The transceiver control system 132 may poll and/or reset the interrupt flag. The transceiver control system 132 may also respond to an interrupt caused by the interrupt flag.

In some embodiments, a frame of samples may be collected from a starting time slice window (or a starting time slice window and a starting amplitude slice window) specified in a first configuration register to an ending time slice window (or an ending time slice window and an ending amplitude slice window) specified in a second configuration register. The frame counter 130 may be configured to count a number of frames collected by the signal monitor 100. After a predetermined number of frames have been collected, the sequencing logic 126 may set a maskable interrupt flag that may indicate completion of frame acquisition. A value for the predetermined number may be stored in a third configuration register. In response to the setting of the maskable interrupt flag, the sequencing logic 126 may stop sample acquisition or may continue to acquire samples based on a bit stored in a frame configuration register. The transceiver control system 132 may poll and/or reset the interrupt flag. The transceiver control system 132 may also respond to an interrupt caused by the interrupt flag.

The trigger flip flop 104 may include a type D flip flop. The trigger flip flop 104 may receive the reference clock signal from the CDR unit 102 and the sample-gate signal from the state machine 124. In response to the sample gate signal being set to 1, the trigger flip flop 104 may pass a rising edge of the reference clock signal to an input of the programmable delay chain 106.

The programmable delay chain 106 may receive the digitized time value from the slice counter 122. The digitized time value may be used to determine a time slice window in which a sample may be acquired. The programmable delay chain 106 may output a delayed rising edge to the sample capture unit 112 in the time slice window. In some embodiments, the programmable delay chain 106 may include delay units 108 and 110.

The delay unit 108 may adjust a relative phase of the reference clock signal to coincide with a cross point of an input signal 107. The relative phase adjustment may be referred to as tracking phase adjustment. The delay unit 108 may be adjusted by a supervisory system outside the state machine 124, such as the transceiver control system 132. A range of the delay unit 108 may cover more than one unit interval (UI). A UI may refer to a unit of information interval such as a time duration of a single bit. Alternatively or additionally, the delay unit 108 may be adjusted by a servo associated with the signal monitor 100 that may maintain an output of the delay unit 108 at a nominal cross point of the input signal 107.

The delay unit 110 may be controlled by the sequencing logic 126 through the digitized time value from the slice counter 122. In some embodiments, the digitized time value may be represented by a group of bits (e.g., 4 bits). The delay unit 110 may include a resolution determined by the group of bits (e.g., a 4-bit resolution) with an increment of 1/14 UI or another suitable increment. A range of the delay unit 110 with a 4-bit resolution and an increment of 1/14 UI may correspond to a range from 0 to 15/14 UI.

In some embodiments, the digitized time value may be determined by the slice counter 122. In response to the delayed rising edge from the programmable delay chain 106, the sample capture unit 112 may capture a digitized amplitude value of the input signal 107 in a time slice window determined by the digitized time value. The digitized amplitude value may determine an amplitude slice window. As a result, the sample capture unit 112 may capture a sample from the input signal 107 within the time slice window and the amplitude slice window. The sample capture unit 112 may send the digitized amplitude value to the address generator 118. An example implementation of the sample capture unit 112 is provided in FIG. 2.

Alternatively, both the digitized time value and the digitized amplitude value may be determined by the slice counter 122. In response to the delayed rising edge from the programmable delay chain 106, the sample capture unit 112 may determine whether a sample of the input signal 107 falls within a time slice window determined by the digitized time value and an amplitude slice window determined by the digitized amplitude value. If there is a sample within the time slice window and the amplitude slice window, the sample capture unit 112 may capture the sample and may set a sample-in-window signal to 1. Otherwise, the sample capture unit 112 may keep the sample-in-window signal to 0. The sample capture unit 112 may feed the sample-in-window signal to the load-increment-store logic 120. Example implementations of the sample capture unit 112 are provided in FIGS. 4A and 4B.

The memory 114 may include volatile memory such as random access memory (RAM), persistent or non-volatile storage including, but not limited to, read only memory (ROM), electrically erasable and programmable ROM (EEPROM), magnetic disk storage or other magnetic storage device, NAND flash memory or other solid state storage device, or other persistent or non-volatile computer storage medium. In some embodiments, the memory 114 may include accumulator registers 116 and configuration registers (not shown in FIG. 1).

Each accumulator register 116 may be associated with a corresponding digitized time value and a corresponding digitized amplitude value. For example, each accumulator register 116 may be associated with a time slice window determined by the corresponding digitized time value and an amplitude slice window determined by the corresponding digitized amplitude value, and may store a value that represents a count of samples that fall within the time slice window and the amplitude slice window. The digitized time value may represent a first sub-group of address bits and the digitized amplitude value may represent a second sub-group of address bits for accessing the corresponding accumulator register 116 in the memory 114. For example, the digitized time value may be converted to first 4 bits and the digitized amplitude value may be converted to second 4 bits so that an 8-bit address may be formed by the first 4 bits and the second 4 bits. The 8-bit address may be used to determine a hit accumulator register 116 from a 16×16 array of accumulator registers 116.

In some embodiments, an entire amplitude range of the input signal 107 may be discretized into 16 amplitude slice windows represented by 4 bits. An entire time range of the input signal 107 across a bit interval may be discretized into 16 time slice windows represented by 4 bits. The memory 114 may include a 16×16 array of accumulator registers 116, with a digitized time value corresponding to a column of the 16×16 array and a digitized amplitude value corresponding to a row of the 16×16 array. In other embodiments, depending on a resolution of the signal monitor 100 and a modulation technique used in the modulation of the input signal 107, a different number of amplitude slice windows and time slice windows may be used so that a different number of accumulator registers 116 may be included in the memory 114.

More generally, the entire amplitude range of the input signal 107 may be discretized into N (e.g., 16) amplitude slice windows represented by $N^{1/2}$ (e.g., 4) bits and the entire time range of the input signal 107 across a bit interval may be discretized into M (e.g., 16) time slice windows represented by $M^{1/2}$ (e.g., 4) bits. The memory 114 may include an N×M (e.g., 16×16) array of accumulator registers 116, with a digitized time value corresponding to a column (or row) of the N×M array and a digitized amplitude value corresponding to a row (or column) of the N×M array. Accordingly, the array of accumulator registers 116 may include N×M (e.g., 256) accumulator registers 116.

The address generator 118 may receive the digitized time value (or data bits corresponding to the digitized time value) from the slice counter 122. The address generator 118 may receive the digitized amplitude value (or data bits corresponding to the digitized amplitude value) from the sample capture unit 112 or the slice counter 122. The address generator 118 may use the digitized time value and the digitized amplitude value to form an address of a hit accumulator register 116.

The load-increment-store logic 120 may fetch a value of the hit accumulator register 116 form the address, increment the value by 1, and store the incremented value back to the address. In some embodiments, the load-increment-store logic 120 may perform operations according to read/write strobes from the state machine 124, in response to receiving a sample-in-window signal with a value of 1 from the sample capture unit 112.

The transceiver control system 132 may be configured to access values stored in the accumulator registers 116 and perform signal quality analysis based on the values. The signal quality analysis may include an eye diagram analysis to provide eye quality metrics (e.g., eye opening, eye overshoot or undershoot, eye width, eye closure, etc.), a bathtub plot analysis, and/or other analysis for the input signal 107.

The leakage system 134 may be configured to periodically scan through the accumulator registers 116 at a certain time interval (e.g., a time interval during which a predetermined number of frames have been collected), and may conditionally subtract a corresponding leakage value from each accumulator register 116. The implementation of leakage may minimize saturation effects in a continuous sampling process without requiring periodic resets or clearing of the accumulator registers 116.

In some embodiments, the leakage system 134 may subtract the same leakage value from each accumulator register 116 to achieve a linear leakage. Alternatively, the leakage system 134 may subtract a leakage value from a corresponding accumulator register 116 based on a value of the corresponding accumulator register 116 to achieve a logarithmic leakage or another suitable type of non-linear leakage. For example, if a first accumulator register 116 has a larger value than a second accumulator register 116, the leakage system 134 may leak the first accumulator register 116 faster than the second accumulator register 116 by subtracting a larger leakage value from the first accumulator register 116. In some embodiments, the leakage system 134 may provide an approximation of a logarithmic scale for values stored in the accumulator registers 116. A leakage rate of the accumulator registers 116 may correspond to a persistence setting on the signal monitor 100.

In some embodiments, the leakage system 134 may be implemented in firmware of the transceiver control system 132. Alternatively, the leakage system 134 may be implemented separately from the transceiver control system 132. The leakage value or the leakage rate may be configured in a configuration register or in the firmware of the transceiver control system 132.

The processor 136 may be of any type including, but not limited to, a central processing unit (CPU), a microprocessor (μP), a microcontroller (μC), a digital signal processor (DSP), or any combination thereof. The processor 136 may be configured to execute computer instructions that, when executed, cause the processor 136 to perform one or more of the operations described herein with respect to the signal monitor 100.

In some embodiments, the signal monitor 100 may additionally include an automatic gain control (AGC) circuit 152. The input signal 107 may be processed by the AGC circuit 152 before entering the CDR unit 102 and the sample capture unit 112. The AGC circuit 152 may control and normalize an amplitude of the input signal 107. For example, if the input signal 107 has a large amplitude, the AGC circuit 152 may apply a lower gain to the input signal 107 to prevent the input signal 107 from overloading and clipping. Alternatively, if the input signal 107 has a small amplitude, the AGC circuit 152 may apply a higher gain to the input signal 107 to increase a resolution of the input signal 107.

Figure 2:
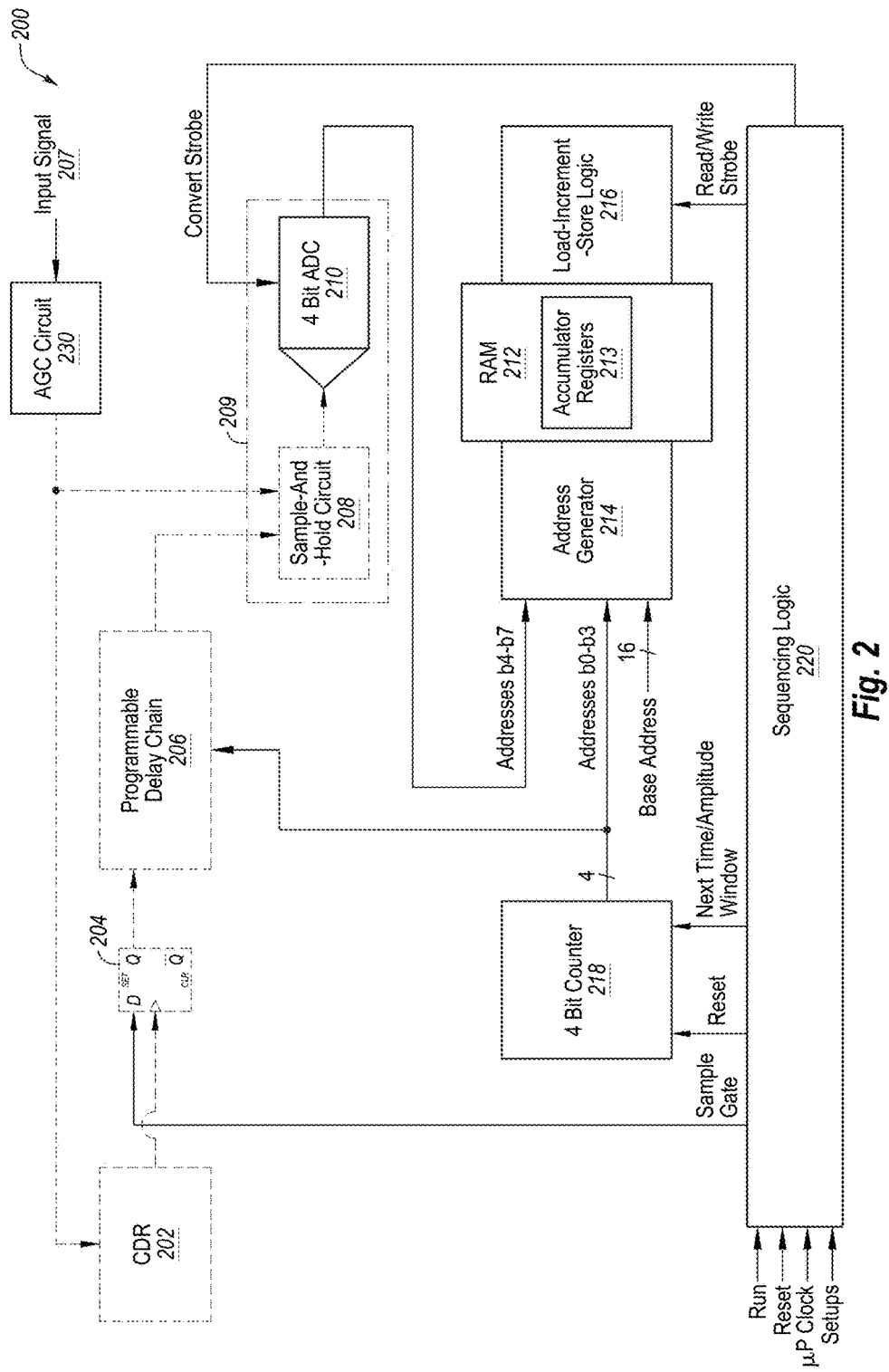
FIG. 2 is a block diagram that illustrates another example on-chip signal monitor.

FIG. 2 is a block diagram that illustrates an example on-chip signal monitor 200, arranged in accordance with at least some embodiments described herein. The signal monitor 200 may be an example implementation of the signal monitor 100 of FIG. 1. The signal monitor 200 may include a CDR unit 202, a trigger flip flop 204, a programmable delay chain 206, a sample capture unit 209, a RAM 212 that includes accumulator registers 213, an address generator 214, a load-increment-store logic 216, a counter 218, a sequencing logic 220, an AGC circuit 230, and other suitable components.

Similar to FIGS. 4A and 4B described below, FIG. 2 uses dashed lines to illustrate or designate high speed signal paths and related components that refer to a reference clock signal from the CDR unit 202 for operations. FIG. 2 uses solid lines to illustrate or designate low speed signal paths and related components that refer to a system clock for operations. The system clock may represent, for example, a clock signal obtained from an example 40 MHz microcontroller CPU, which may be lower than the reference clock signal from the CDR unit 202.

The CDR unit 202, the trigger flip flop 204, the programmable delay chain 206, the accumulator registers 213, the address generator 214, the load-increment-store logic 216, the counter 218, the sequencing logic 220, and the AGC circuit 230 may be identical or similar to the CDR unit 102, the trigger flip flop 104, the programmable delay chain 106, the accumulator registers 116, the address generator 118, the load-increment-store logic 120, the slice counter 122, the sequencing logic 126, and the AGC circuit 152 of FIG. 1, respectively. Similar description will not be repeated here. In some embodiments, the signal monitor 200 may also include a transceiver control system similar or identical to the transceiver control system 132 of FIG. 1 and a leakage system similar or identical to the leakage system 134 of FIG. 1.

The signal monitor 200 may sample an amplitude of an input signal 207 directly, which may be referred to as a directing sampling technique. The sequencing logic 220 may set a sample gate signal to 1 to initiate acquisition of a sample. After the sample is acquired, the sequencing logic 220 may set the sample gate signal to 0. In some embodiments, the sequencing logic 220 may include a sample counter similar or identical to the sample counter 128 of FIG. 1, which may be used to count a number of samples collected in a selected time slice window and/or a selected amplitude slice window. The sequencing logic 220 may also include a frame counter similar or identical to the frame counter 130 of FIG. 1, which may be used to count a number of frames collected from a starting time slice window (or a starting time slice window and a starting amplitude slice window) to an ending time slice window (or an ending time slice window and an ending amplitude slice window).

The counter 218 may be controlled by the sequencing logic 220 to provide a digitized time value that may be used to determine a time slice window. In FIG. 2, the counter 218 is implemented as a 4-bit counter by way of example, and a time range across a bit interval is discretized into $2^4=16$ time slice windows. In other embodiments, the counter 218 may be implemented to include one or more bits.

The sample capture unit 209 may include a sample-and-hold circuit 208 and an analog-to-digital converter (ADC) 210. In response to receiving a delayed rising edge from the programmable delay chain 206, the sample-and-hold circuit 208 may capture and integrate the input signal 207 over a time slice window determined by the digitized time value. The sample-and-hold circuit 208 may output an average voltage of the input signal 207 over the time slice window. For example, the sample-and-hold circuit 208 may include a gate time and integration functionality such that it may provide an average of the input signal 207 over the time slice window.

The ADC 210 may be configured to receive the average voltage of the input signal 207 from the sample-and-hold circuit 208 and may digitize the average voltage of the input signal 207 to a digitized amplitude value. In FIG. 2, the ADC 210 is implemented as a 4-bit ADC by way of example, and an amplitude range of the input signal 207 is discretized into $2^4=16$ amplitude slice windows. The 4-bit ADC may be implemented as a flash converter, which may minimize state machine clock cycles for acquiring a sample. If a flash converter is not practical, a 4-bit successive approximation register (SAR) converter may be used as the ADC 210. In other embodiments, the ADC 210 may be implemented with a resolution lower or higher than a 4-bit resolution. An upper reference and a lower reference for the ADC 210 may be fixed and determined by limits of a dynamic range of the input signal 207 or by dynamically tracking the input signal 207 using peak detectors. Alternatively, the upper reference and the lower reference for the ADC 210 may be selected with a bit stored in a configuration register.

The address generator 214 may receive the digitized time value (or data bits corresponding to the digitized time value) from the counter 218. The address generator 214 may receive the digitized amplitude value (or data bits corresponding to the digitized amplitude value) from the ADC 210 of the sample capture unit 209. The address generator 214 may use the digitized time value and the digitized amplitude value to form an address of a hit accumulator register 213. For example, the digitized time value may be converted to first 4 bits and the digitized amplitude value may be converted to second 4 bits so that an 8-bit address may be formed for a hit accumulator register 213 from a 16×16 array. The load-increment-store logic 216 may fetch a value of the hit accumulator register 213 from the address, increment the value by 1, and store the incremented value back to the address.

FIGS. 3A-3D are a flow diagram of an example method 300 of acquiring multiple frames of samples using the signal monitor 200 of FIG. 2, arranged in accordance with at least some embodiments described herein. FIGS. 3A-3D are described with reference to FIG. 2. Although illustrated as discrete blocks, various blocks may be divided into additional blocks, combined into fewer blocks, or eliminated, depending on the desired implementation.

Figure 3A:
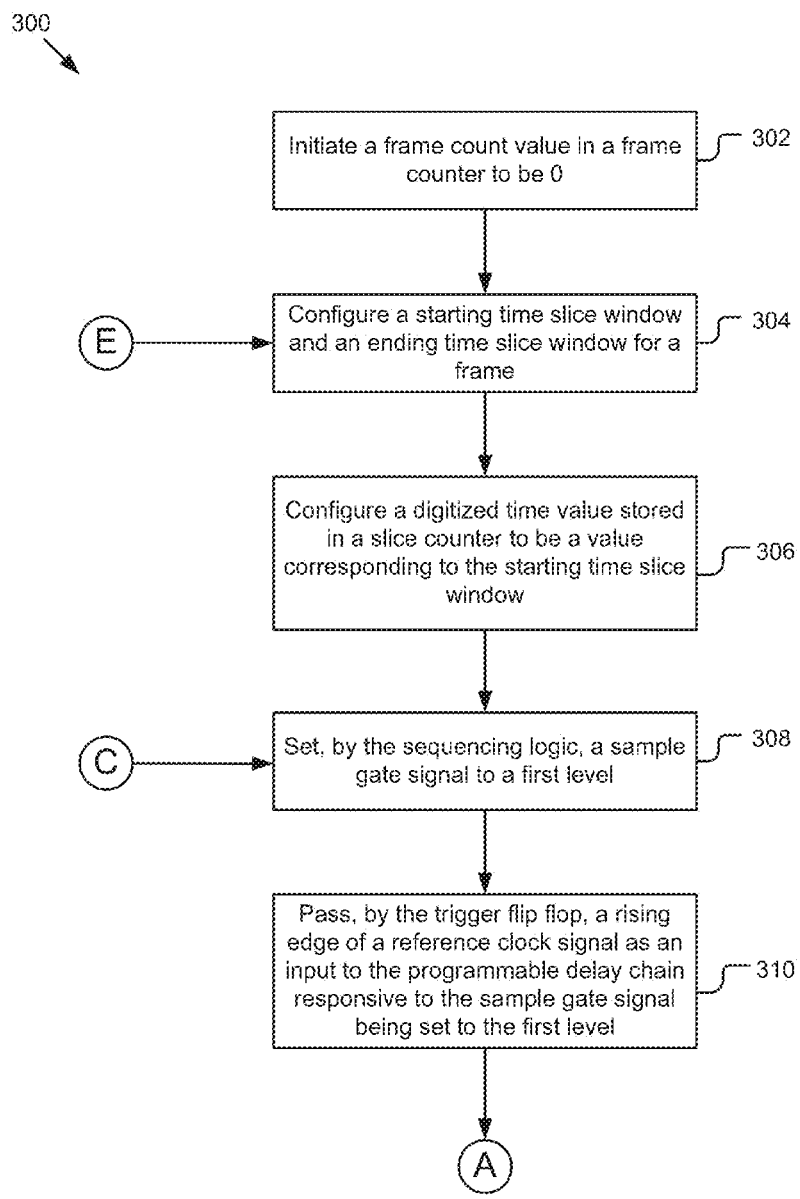
FIGS. 3A-3D are a flow diagram of an example method of acquiring multiple frames of samples using the example on-chip signal monitor of FIG. 2.

Referring to FIG. 3A, the method 300 may begin at block 302 in which a frame count value stored in a frame counter may be initiated to be zero. The frame count value may be used to count a number of frames collected by a corresponding signal monitor such as the signal monitor 200 of FIG. 2.

At block 304, a starting time slice window and an ending time slice window may be configured for a frame. The starting time slice window may not be the first time slice window and may be any suitable time slice window configured for the frame. The ending time slice window may not be the last time slice window and may be any suitable time slice window configured for the frame.

At block 306, a digitized time value stored in a slice counter may be configured to be a value corresponding to the starting time slice window so that the frame of samples may begin from the starting time slice window. The slice counter may include the counter 218 of FIG. 2, for example.

At block 308, a sample gate signal may be set to a first level (e.g., the first level=1) by the sequencing logic 220. For example, the sequencing logic 220 may change the sample gate signal from a second level to the first level (e.g., from the second level of 0 to the first level of 1) after a suitable settling time for the time slice window determination.

At block 310, a rising edge of a reference clock signal may be passed by the trigger flip flop 204 as an input to the programmable delay chain 206 responsive to the sample gate signal being set to the first level. For example, the rising edge of the reference clock signal may set a 1 at the input to the programmable delay chain 206.

Figure 3B:
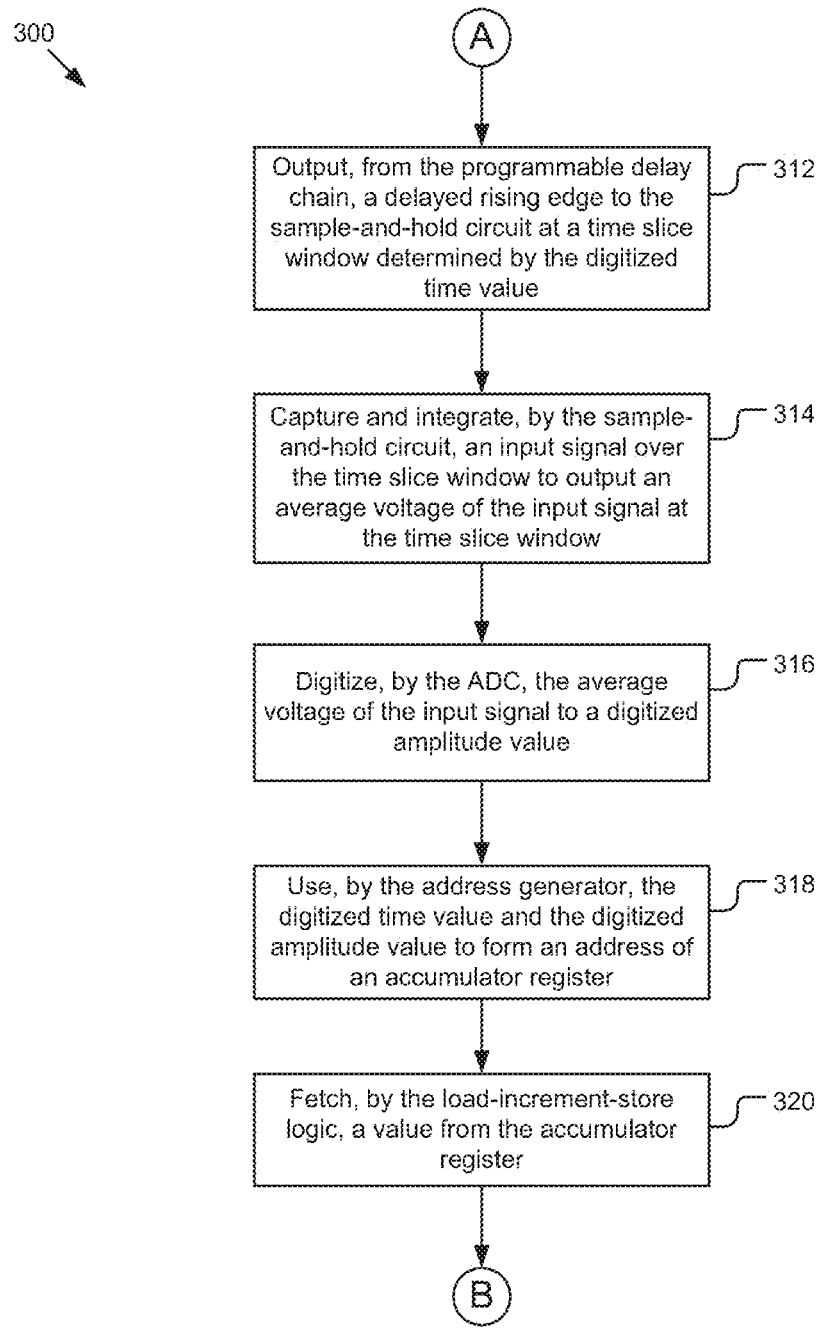

Referring to FIG. 3B, at block 312, a delayed rising edge may be outputted from the programmable delay chain 206 to the sample-and-hold circuit 208 at the time slice window determined by the digitized time value.

At block 314, an input signal may be captured and integrated over the time slice window by the sample-and-hold circuit 208 to output an average voltage of the input signal at the time slice window. In some embodiments, the time slice window may have a width of $1/14$ UI. In some embodiments, the input signal may be pre-processed by the AGC circuit 230 before entering the sample-and-hold circuit 208.

At block 316, the average voltage of the input signal may be digitized by the ADC 210 to a digitized amplitude value.

At block 318, the digitized time value and the digitized amplitude value may be used by the address generator 214 to form an address of an accumulator register 213 in the RAM 212. For example, the digitized time value may form a first sub-group of address bits for the address of the accumulator register 213, and the digitized amplitude value may form a second sub-group of address bits for the address of the accumulator register 213.

At block 320, a value stored in the accumulator register 213 may be fetched by the load-increment-store logic 216 using the address.

Figure 3C:
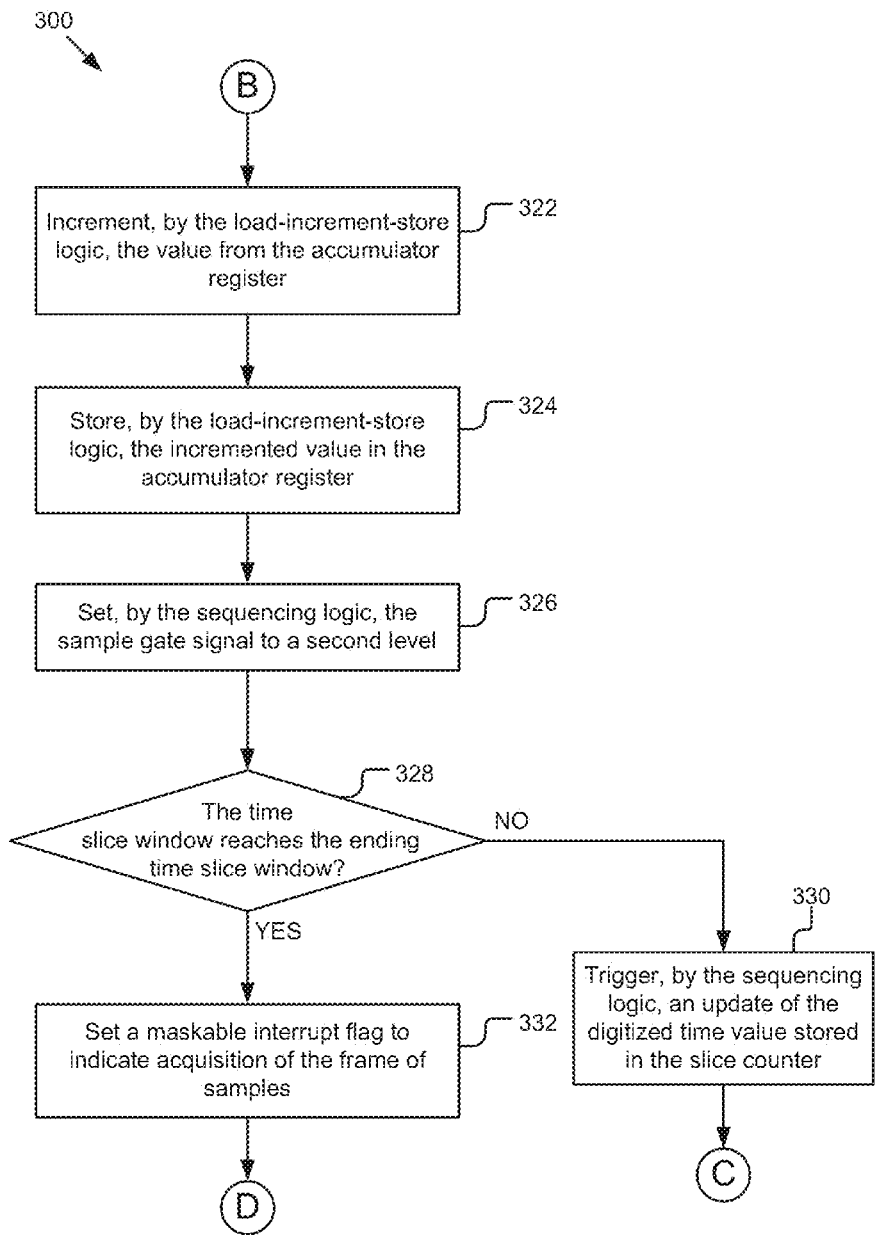

Referring to FIG. 3C, at block 322, the value from the accumulator register 213 may be incremented by the load-increment-store logic 216. For example, the load-increment-store logic 216 may increase the value by 1. In some embodiments, the load-increment-store logic 216 may clamp the value at a maximal value.

At block 324, the incremented value may be stored by the load-increment-store logic 216 to the accumulator register 213 using the address.

At block 326, the sample gate signal may be set to the second level (e.g., a level that represents 0) by the sequencing logic 220.

At block 328, the method 300 may include determining whether the time slice window reaches the ending time slice window of the frame. If the time slice window reaches the ending time slice window of the frame, which may indicate that the frame of samples has been collected, the method 300 may proceed to block 332. Otherwise, the method 300 may proceed to block 330.

At block 330, an update of the digitized time value stored in the slice counter (e.g., the counter 218) may be triggered by the sequencing logic 220. For example, the sequencing logic 220 may set a next-time/amplitude-window signal to a trigger level (e.g., a level of 1) to trigger an update of the digitized time value stored in the slice counter so that the sample acquisition proceeds to a next time slice window. The method 300 may return to block 308 of FIG. 3A for capturing another sample in the frame.

At block 332, a maskable interrupt flag may be set to indicate acquisition of the frame of samples. The method 300 may proceed to block 334 of FIG. 3D.

Figure 3D:
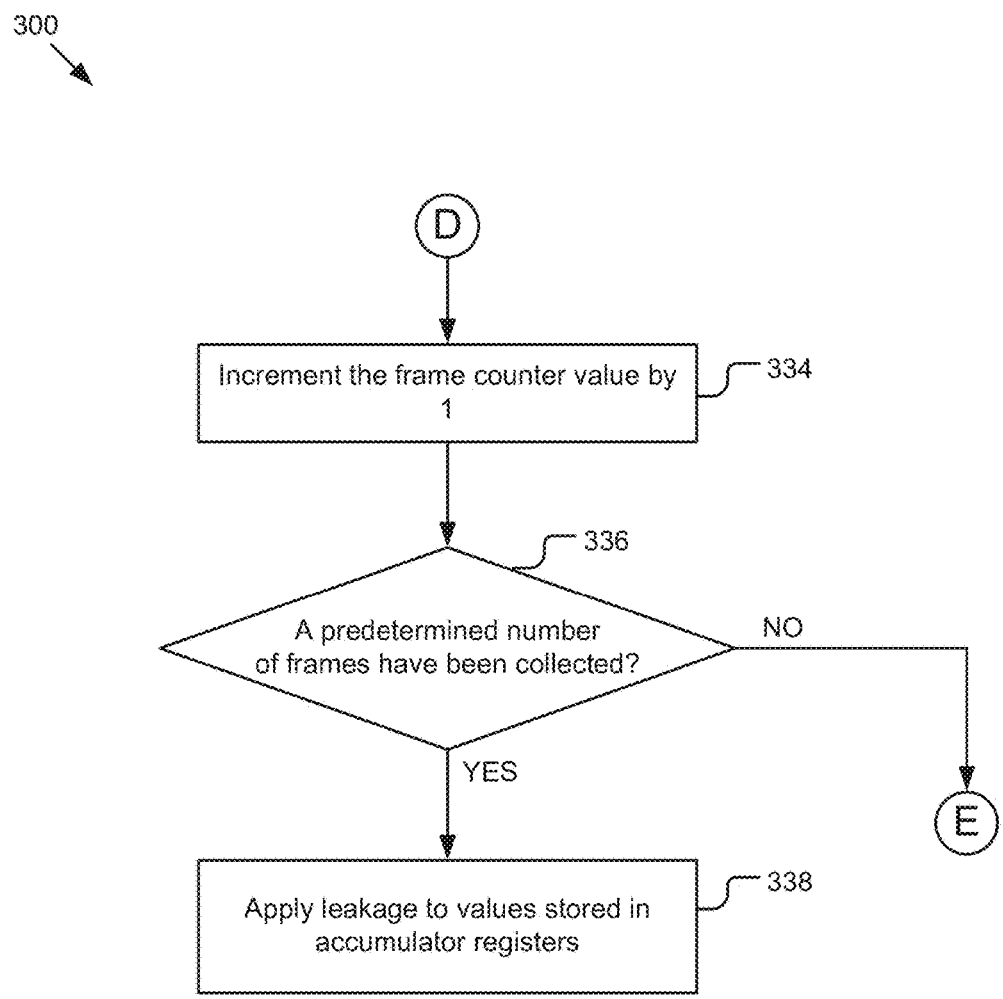

Referring to FIG. 3D, at block 334, the frame counter value may be incremented by 1 to indicate that the frame of samples have been acquired.

At block 336, the method 300 may include determining whether a predetermined number of frames have been collected. For example, the method 300 may include determining whether the frame counter value reaches the predetermined number of frames. If the predetermined number of frames have been collected, the method 300 may proceed to block 338. Otherwise, the method 300 may return to block 304 of FIG. 3A to continue collecting at least an additional frame of samples.

At block 338, leakage may be applied to values stored in accumulator registers 213. Alternatively or additionally, a trigger bit may be configured by a leakage system, a control system, or another suitable component or system to trigger execution of the leakage.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, a map of likelihood that the input signal may pass through each region determined by a corresponding amplitude slice window and a corresponding time slice window may be developed in a RAM array of accumulator registers 213. Values stored in the accumulator registers 213 may be retrieved and analyzed for eye quality analysis and PAM slice level adjustment. Multiple cycles may be run without resetting the accumulator registers 213 to accumulate sample readings in low density regions of the eye diagram.

Figure 4A:
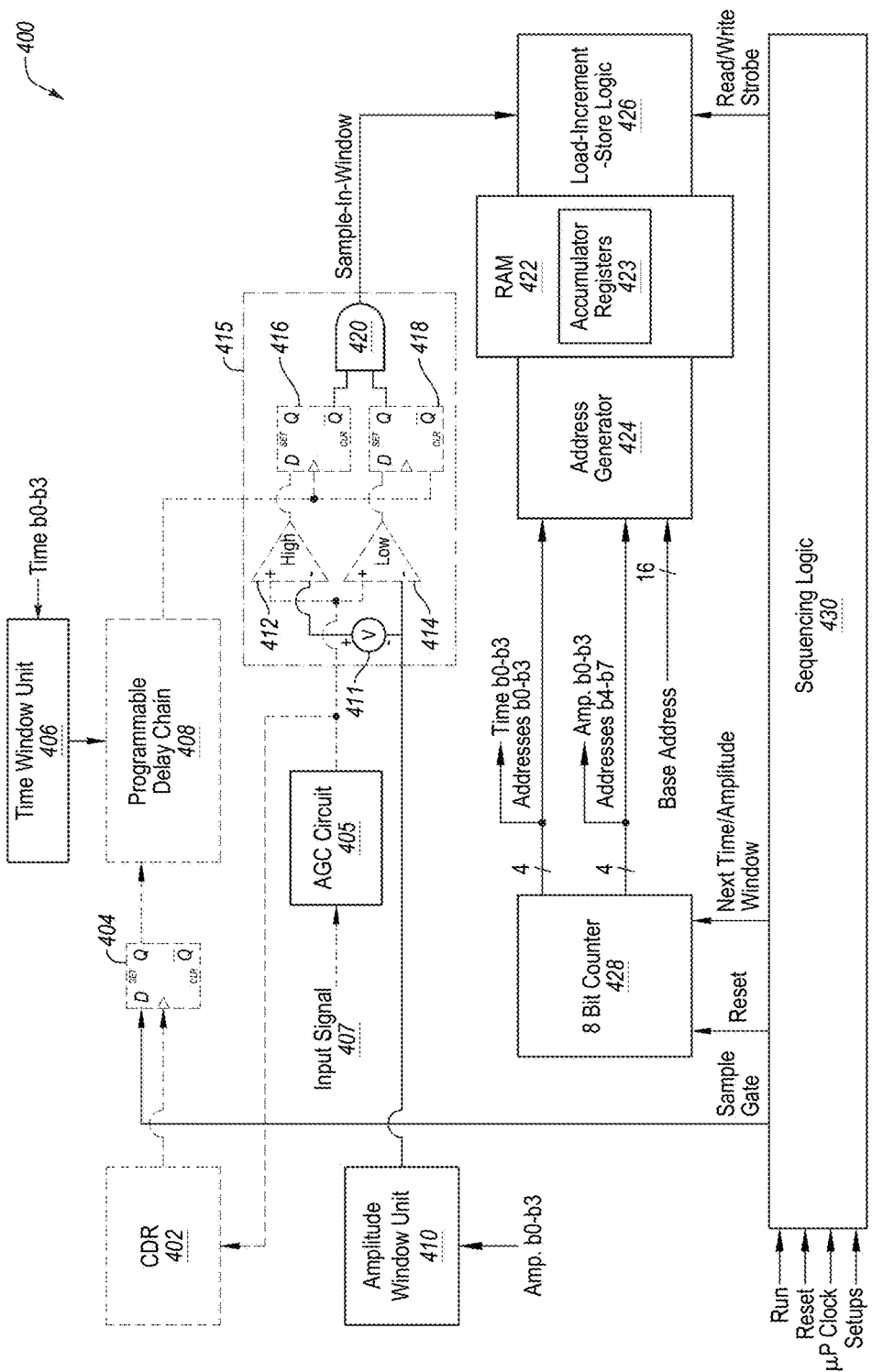
FIGS. 4A and 4B are block diagrams that illustrate additional example on-chip signal monitors.

FIG. 4A is block diagram that illustrates another example on-chip signal monitor 400, arranged in accordance with at least some embodiments described herein. The signal monitor 400 may be an example implementation of the signal monitor 100 of FIG. 1. The signal monitor 400 may include a CDR unit 402, a trigger flip flop 404, a time window unit 406, a programmable delay chain 408, an amplitude window unit 410, a sample capture unit 415, a RAM 422 that includes accumulator registers 423, an address generator 424, a load-increment-store logic 426, a counter 428, a sequencing logic 430, an AGC circuit 405, and other suitable components.

The CDR unit 402, the trigger flip flop 404, the programmable delay chain 408, the accumulator registers 423, the address generator 424, the load-increment-store logic 426, the counter 428, the sequencing logic 430, and the AGC circuit 405 may be identical or similar to the CDR unit 102, the trigger flip flop 104, the programmable delay chain 106, the accumulator registers 116, the address generator 118, the load-increment-store logic 120, the slice counter 122, the sequencing logic 126, and the AGC circuit 152 of FIG. 1, respectively. Similar description will not be repeated here. In some embodiments, the signal monitor 400 may also include a transceiver control system similar or identical to the transceiver control system 132 of FIG. 1 and a leakage system similar or identical to the leakage system 134 of FIG. 1.

The signal monitor 400 may use an amplitude window statistical sampling technique. The sequencing logic 430 may set a sample gate signal to 1 to initiate acquisition of a sample. After the sample is acquired, the sequencing logic 430 may set the sample gate signal to 0. In some embodiments, the sequencing logic 430 may include a sample counter similar or identical to the sample counter 128 of FIG. 1, which may be used to count a number of samples collected in a selected time slice window and a selected amplitude slice window. The sequencing logic 430 may also include a frame counter similar or identical to the frame counter 130 of FIG. 1, which may be used to count a number of frames collected from a starting time slice window and a starting amplitude slice window to an ending time slice window and an ending amplitude slice window.

The counter 428 may be controlled by the sequencing logic 430 and may be a 2n-bit counter to provide a first group of n bits for determining a digitized time value and a second group of n bits for determining a digitized amplitude value. The time window unit 406 may convert the first group of n bits to a digitized time value for determining a time slice window. The amplitude window unit 410 may convert the second group of n bits to a digitized amplitude value for determining an amplitude slice window. The first group of n bits and the second group of n bits may be used by the address generator 424 to form an address of a hit accumulator register 423 in the RAM 422.

In FIG. 4A, the counter 428 is implemented as an 8-bit counter (n=4) by way of example, with a time range across a bit interval being discretized into $2^4=16$ time slice windows and an entire amplitude range of an input signal 407 being discretized into $2^4=16$ amplitude slice windows. In other embodiments, the counter 428 may be implemented as a counter that includes two or more bits.

In response to receiving a delayed rising edge from the programmable delay chain 408, the sample capture unit 415 may capture a sample from the input signal 407 and set a sample-in-window signal to 1 if the sample falls within the time slice window determined by the digitized time value and the amplitude slice window determined by the digitized amplitude window. In some embodiments, the amplitude slice window may include an upper threshold and a lower threshold. The lower threshold may be equal to the digitized amplitude value, and the upper threshold may be equal to the lower threshold plus an amplitude band covered by the amplitude slice window. For example, the upper threshold may be equal to the lower threshold plus a voltage 411, with the voltage 411 equal to $$\frac{1}{2^n} Vcc.$$

Vcc may represent an upper voltage limit of the input signal 407.

The sample capture unit 415 may include an upper comparator 412, a lower comparator 414, an upper latch 416, a lower latch 418, and an AND gate 420. The lower comparator 414 may compare the lower threshold (which is equal to the digitized amplitude value from the amplitude window unit 410) with an amplitude of the input signal 407. The lower comparator 414 may output a value of 1 to the lower latch 418 if the amplitude of the input signal 407 is not lower than the lower threshold. The lower comparator 414 may output a value of 0 to the lower latch 418 if the amplitude of the input signal 407 is lower than the lower threshold. The lower comparator 414 may refer to a range between 0 and $$\frac{2^n - 1}{2^n} Vcc.$$

The lower latch 418 may capture a state of the output of the lower comparator 414. For example, the lower latch 418 may output a Q value of 1 (equivalently, $\overline{Q}=0$) if the amplitude of the input signal 407 is not lower than the lower threshold and a Q value of 0 (equivalently, $\overline{Q}=1$) if the amplitude of the input signal 407 is lower than the lower threshold.

The upper comparator 412 may compare the upper threshold with the amplitude of the input signal 407. The upper comparator 412 may output a value of 1 to the upper latch 416 if the amplitude of the input signal 407 is not lower than the upper threshold and a value of 0 to the upper latch 416 if the amplitude of the input signal 407 is lower than the upper threshold. The upper comparator 412 may refer to a range between $$\frac{1}{2^n} Vcc \text{ and } Vcc.$$

The upper latch 416 may capture a state of the output of the upper comparator 412. For example, the upper latch 416 may output a Q value of 1 (equivalently, $\overline{Q}=0$) if the amplitude of the input signal 407 is not lower than the upper threshold and a Q value of 0 (equivalently, $\overline{Q}=1$) if the amplitude of the input signal 407 is lower than the upper threshold.

In some embodiments, the sample capture unit 415 may include the AND gate 420 that may receive inputs as the Q output from the lower latch 418 and the $\overline{Q}$ output from the upper latch 416. If the Q output from the lower latch 418 and the $\overline{Q}$ output from the upper latch 416 are the same (e.g., $Q_{Lower}=1$ from the lower latch 418, $\overline{Q}_{Upper}=1$ from the upper latch 416), the AND gate 420 may generate a sample-in-window signal with a value of 1, indicating that the amplitude of the input signal 407 is lower than the upper threshold but not lower than the lower threshold (or equivalently the amplitude of the input signal 407 is within the amplitude slice window, or equivalently the input signal 407 passes through the amplitude band bounded by the lower comparator 414 and the upper comparator 412). Thus, the sample capture unit 415 may capture a sample within the time slice window and the amplitude slice window. If the Q output from the lower latch 418 and the $\overline{Q}$ output from the upper latch 416 are different ($Q_{Lower}=1$ AND $\overline{Q}_{Upper}=0$, or $Q_{Lower}=0$ AND $\overline{Q}_{Upper}=1$), the AND gate 420 may generate a sample-in-window signal with a value of 0, indicating that the input signal 407 does not pass through the amplitude band bounded by the lower comparator 414 and the upper comparator 412. The sample capture unit 415 in this case does not capture a sample within the time slice window and the amplitude slice window.

Alternatively, the sample capture unit 415 may include an XOR gate rather than the AND gate 420 in FIG. 4A. The XOR gate may receive inputs as the Q output from the lower latch 418 and the Q output from the upper latch 416. If the Q output from the lower latch 418 and the Q output from the upper latch 416 are different ($Q_{Lower}=1$ AND $Q_{Upper}=0$), the XOR gate 420 may generate a sample-in-window signal with a value of 1, indicating that the amplitude of the input signal 407 is lower than the upper threshold but not lower than the lower threshold. Thus, the sample capture unit 415 may capture a sample within the time slice window and the amplitude slice window. If the Q output from the lower latch 418 and the Q output from the upper latch 416 are the same ($Q_{Lower}=1$ AND $Q_{Upper}=1$, or $Q_{Lower}=0$ AND $Q_{Upper}=0$), the XOR gate 420 may generate a sample-in-window signal with a value of 0, indicating the input signal 407 does not pass through the amplitude band bounded by the lower comparator 414 and the upper comparator 412. The sample capture unit 415 in this case does not capture a sample within the time slice window and the amplitude slice window.

The sample capture unit 415 illustrated in FIG. 4A includes a corresponding latch for each comparator, which may minimize effects of differences in the rise and/or fall time in the comparators, asymmetry of the comparators' slew rates, integration time, and skew in thresholds of subsequent logic. Alternatively, the sample capture unit 415 may include the lower comparator 414, the upper comparator 412, an XOR gate (or an AND gate) that may receive outputs from the lower comparator 414 and the upper comparator 412, and a single latch that may receive an output from the XOR gate (or the AND gate).

The address generator 424 may receive the first group of bits and the second group of bits from the counter 428 to form an address of a hit accumulator register 423. For example, the first group of bits may include 4 bits to form bits 0-3 of the address and the second group of bits may include 4 bits to form bits 4-7 of the address. The accumulator registers 423 may include a 16×16 array of registers, with a digitized time value corresponding to a column of the 16×16 array and a digitized amplitude value corresponding to a row of the 16×16 array.

Responsive to the sample-in-window signal being 1, the load-increment-store logic 426 may fetch a value of the hit accumulator register 423 from the address, increment the value by 1, and store the incremented value back to the address.

Given a probability p that a signal trajectory of any random data bit passes through a selected time slice window and a selected amplitude slice window, a probability of capturing a sample of the signal may be at least $$\frac{p}{2^n}.$$

Comparing to the sample acquisition by the signal monitor 200 of FIG. 2, which may acquire a sample every trigger cycle, the signal monitor 400 may need significantly more than $2^n$ samples at each time and/or amplitude selection to give confidence in the result. The signal monitor 400 may have no trouble with flat (direct current (DC)) trajectories and may capture samples with flat trajectories with some probability.

Figure 4B:
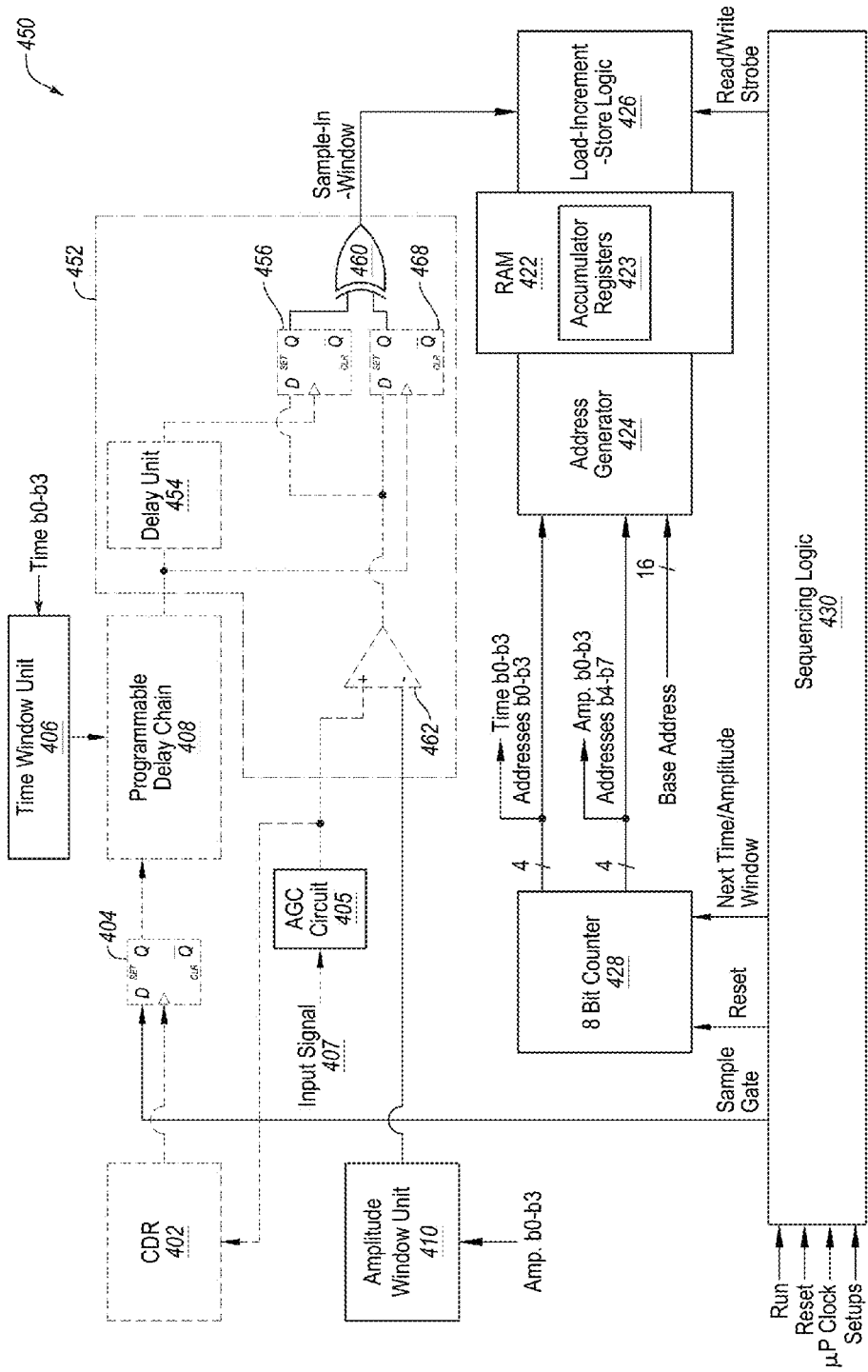

FIG. 4B is block diagram that illustrates another example on-chip signal monitor 450, arranged in accordance with at least some embodiments described herein. The signal monitor 450 may be an example implementation of the signal monitor 100 of FIG. 1. The signal monitor 450 may include the CDR unit 402, the trigger flip flop 404, the time window unit 406, the programmable delay chain 408, the amplitude window unit 410, a sample capture unit 452, the RAM 422 that includes the accumulator registers 423, the address generator 424, the load-increment-store logic 426, the counter 428, the sequencing logic 430, the AGC circuit 405, and other suitable components. In some embodiments, the signal monitor 450 may also include a transceiver control system similar or identical to the transceiver control system 132 of FIG. 1 and a leakage system similar or identical to the leakage system 134 of FIG. 1.

The signal monitor 450 may use a time window statistical sampling technique. The signal monitor 450 may include components similar or identical to those of the signal monitor 400 of FIG. 4A. Similar description will not be repeated here. The signal monitor 450 includes the sample capture unit 452, which is different from the sample capture unit 415 of FIG. 4A.

In response to receiving a delayed rising edge from the programmable delay chain 408, the sample capture unit 452 may capture a sample from the input signal 407 and set a sample-in-window signal to 1 if the sample falls within a time slice window determined by a digitized time value and an amplitude slice window determined by a digitized amplitude window. The digitized time value and the digitized amplitude value may be determined by the counter 428.

The sample capture unit 452 may include a delay 454, a comparator 462, an upper latch 456, a lower latch 468, and an XOR gate 460. The comparator 462 may compare the digitized amplitude value from the amplitude window unit 410 with an amplitude of the input signal 407. The comparator 462 may output a value of 1 if the current amplitude of the input signal 407 is not lower than the digitized amplitude value. The comparator 462 may output a value of 0 if the current amplitude of the input signal is lower than the digitized amplitude value.

An output from the programmable delay chain 408 may be fed to the lower latch 468 directly. The delay 454 may delay the output from the programmable delay chain 408 by a delay time equal to a length of the time slice window $$\left(\text{e.g., } \frac{1}{2^n} UI\right).$$

The delayed output of the programmable delay chain 408 may be fed to the upper latch 456 from the delay 454.

The upper latch 456 and the lower latch 468 may form a window in time (e.g., a time band) with the length of the time slice window. The lower latch 468 may capture a state of the output from the comparator 462 at a leading edge of the time slice window. For example, at the leading edge of the time slice window, the lower latch 468 may output: a Q value of 1 (equivalently, $\overline{Q}=0$) if the amplitude of the input signal 407 is not lower than the digitized amplitude value; and a Q value of 0 (equivalently, $\overline{Q}=1$) if the amplitude of the input signal 407 is lower than the digitized amplitude value.

The upper latch 456 may capture the state of the output from the comparator 462 at a trailing edge of the time slice window. For example, at the trailing edge of the time slice window, the upper latch 456 may output: a Q value of 1 (equivalently, $\overline{Q}$=0) if the amplitude of the input signal 407 is not lower than the digitized amplitude value; and a Q value of 0 (equivalently, $\overline{Q}$=1) if the amplitude of the input signal 407 is lower than the digitized amplitude value.

In some embodiments, the sample capture unit 452 may include the XOR gate 460 that may receive inputs as the Q output from the lower latch 468 and the Q output from the upper latch 456. If the Q output from the lower latch 468 and the Q output from the upper latch 456 are different ($Q_{Lower}$=1 AND $Q_{upper}$=0), indicating that the input signal 407 passes through the time band bounded by the lower latch 468 and the upper latch 456, the XOR gate 460 may generate a sample-in-window signal with a value of 1. Thus, the sample capture unit 452 may capture a sample within the time slice window and the amplitude slice window.

The pass of the input signal 407 through the time band bounded by the lower latch 468 and the upper latch 456 may indicate that: (1) the input signal 407 may be above the digitized amplitude value when the lower latch 468 is clocked at the start of the time slice window; (2) the input signal 407 may decrease its amplitude through the time slice window; and (3) the input signal 407 may be below the digitized amplitude value when the upper latch 456 is clocked at the end of the time slice window.

If the Q output from the lower latch 468 and the Q output from the upper latch 456 are the same ($Q_{Lower}$=1 AND $Q_{upper}$=1, or $Q_{Lower}$=0 AND $Q_{Upper}$=0), indicating that the input signal 407 does not pass through the time band bounded by the lower latch 468 and the upper latch 456, the XOR gate 460 may generate a sample-in-window signal with a value of 0. The sample capture unit 452 in this case does not capture a sample within the time slice window and the amplitude slice window.

The address generator 424 may receive a first group of bits and a second group of bits from the counter 428 to form an address of a hit accumulator register 423. Responsive to the sample-in-window signal being 1, the load-increment-store logic 426 may fetch a value of the hit accumulator register 423 from the address, increment the value by 1, and store the incremented value back to the address.

With combined reference to FIGS. 2 and 4A-4B, example comparison between the signal monitors 200, 400, and 450 may be provided herein. Compared to signal monitors 400 and 450 of FIGS. 4A and 4B, the signal monitor 200 of FIG. 2 may capture a digitized amplitude value and result in a value increment of a corresponding hit accumulator register during each sample acquisition process. Samples may accumulate more quickly and with no statistical uncertainty.

Given a design with an 8-bit array of accumulator registers and a normal microcontroller bus interface, two microcontroller bus cycles each with 100 nanoseconds (ns) may be needed for a load-increment-store operation. $2^8$=256 load-increment-store operations may represent one full sample frame. Assume that the triggering of the sample and sequencing may be interlaced with the load-increment-store operations, which may lead to a full sample frame time of 2×100 ns×256=51.2 microseconds (μs). However, one sample frame may still be not enough to ensure a thorough picture of the signal waveform. Some confidence may be gained after 16 full frames, but in some embodiments an order of 256 full frames may be needed at minimum to give good confidence.

The signal monitor 200 of FIG. 2 may take 51.2 μs/frame× 256 frames=13.1 microseconds (ms) to achieve the confidence, which may provide dramatic tracking performance in an EDC equalizer. A minimal oversampling for the signal monitors 400 and 450 of FIGS. 4A and 4B may include 16 samples per time/amplitude window or 16 times more frames than the signal monitor 200 of FIG. 2. The signal monitors 400 and 450 may take 13.1 ms×16=209.7 ms to achieve similar confidence as the signal monitor 200, which is slower than the signal monitor 200.

By providing minimum and maximum settings for the time and amplitude ranges in a frame, partial frames may be analyzed more quickly. Adaptive algorithms may be implemented which may allow a fast and coarse acquisition and then fine tracking of the eye openings at higher update rates, compared to a whole array of accumulator registers being scanned in each frame.

FIGS. 5A-5E are a flow diagram of an example method 500 of acquiring multiple frames of samples using the example on-chip signal monitor 400 of FIG. 4A or the example on-chip signal monitor 450 of FIG. 4B, arranged in accordance with at least some embodiments described herein. FIGS. 5A-5E are described with reference to FIG. 4A or FIG. 4B. Although illustrated as discrete blocks, various blocks may be divided into additional blocks, combined into fewer blocks, or eliminated, depending on the desired implementation.

Figure 5A:
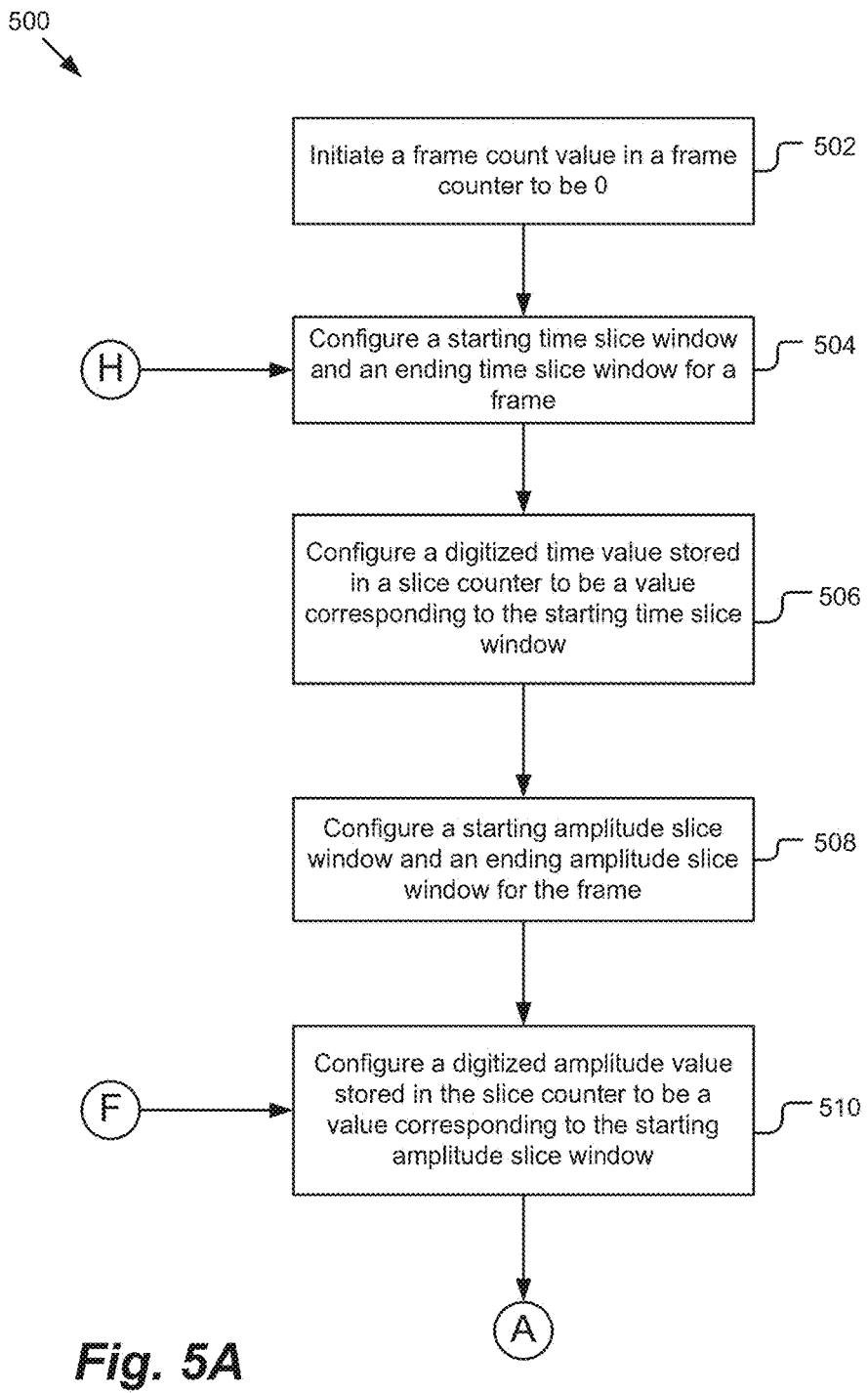
FIGS. 5A-5E are a flow diagram of an example method of acquiring multiple frames of samples using the example on-chip signal monitor of FIG. 4A or the example on-chip signal monitor of FIG. 4B.

Referring to FIG. 5A, the method 500 may begin at block 502 in which a frame count value stored in a frame counter may be initiated to be zero. The frame count value may be used to count a number of frames collected by the signal monitor 400 or 450.

At block 504, a starting time slice window and an ending time slice may be configured for a frame.

At block 506, a digitized time value stored in a slice counter (e.g., the counter 428) may be configured to be a value corresponding to the starting time slice window. The digitized time value may be represented by a first sub-group of bits stored in the slice counter.

At block 508, a starting amplitude slice window and an ending amplitude slice window may be configured for the frame of samples.

At block 510, a digitized amplitude value stored in the slice counter may be configured to be a value corresponding to the starting amplitude slice window. The digitized amplitude value may be represented by a second sub-group of bits stored in the slice counter.

Figure 5B:
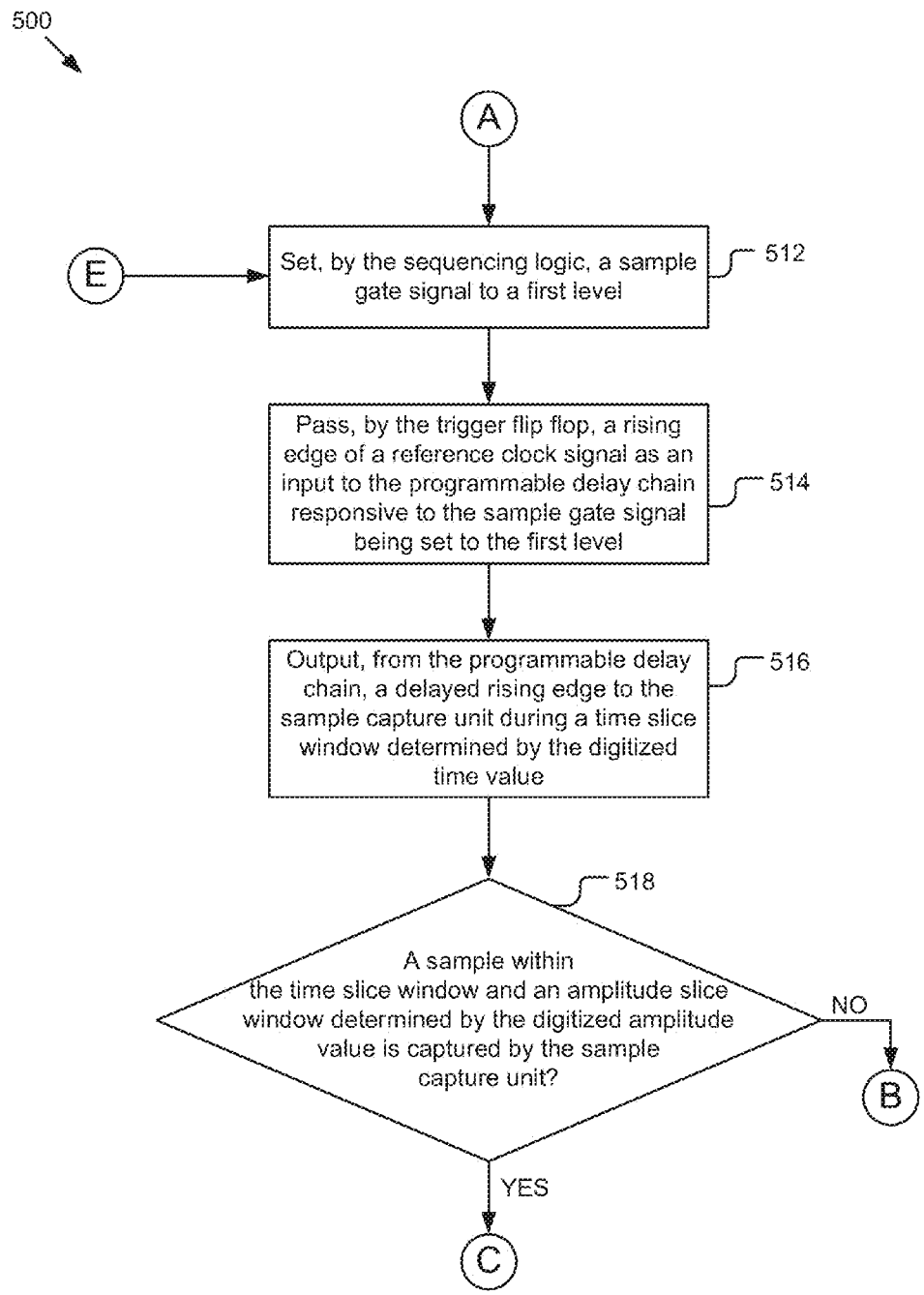

Referring to FIG. 5B, at block 512, a sample gate signal may be set to a first level (e.g., a level of 1) by the sequencing logic 430. For example, the sequencing logic 430 may change the sample gate signal from a second level to the first level (e.g., from a level of 0 to a level of 1) after a suitable settling time for the time slice window and amplitude slice window determination.

At block 514, a rising edge of a reference clock signal may be passed by the trigger flip flop 404 as an input to the programmable delay chain 408 responsive to the sample gate signal being set to the first level. For example, the rising edge of the reference clock signal may set a 1 at the input to the programmable delay chain 408.

At block 516, a delayed rising edge may be outputted from the programmable delay chain 408 to the sample capture unit 415 of FIG. 4A (or the sample capture unit 452 of FIG. 4B) at the time slice window determined by the digitized time value.

At block 518, the method 500 may include determining whether a sample within the time slice window and the amplitude slice window is captured from an input signal by the sample capture unit 415 of FIG. 4A (or the sample capture unit 452 of FIG. 4B). If the sample is captured, the method 500 may proceed to block 520 of FIG. 5C. Otherwise, the method 500 may proceed to block 530 of FIG. 5D. For example, the sample capture unit 415 may determine whether the input signal may pass an amplitude band associated with the amplitude slice window during the time slice window. If the input signal passes the amplitude band, a sample may be captured from the input signal. In another example, the sample capture unit 452 may determine whether the input signal may pass a time band associated with the time slice window at an amplitude level of the digitized amplitude value. If the input signal passes the time band, a sample may be captured from the input signal.

Figure 5C:
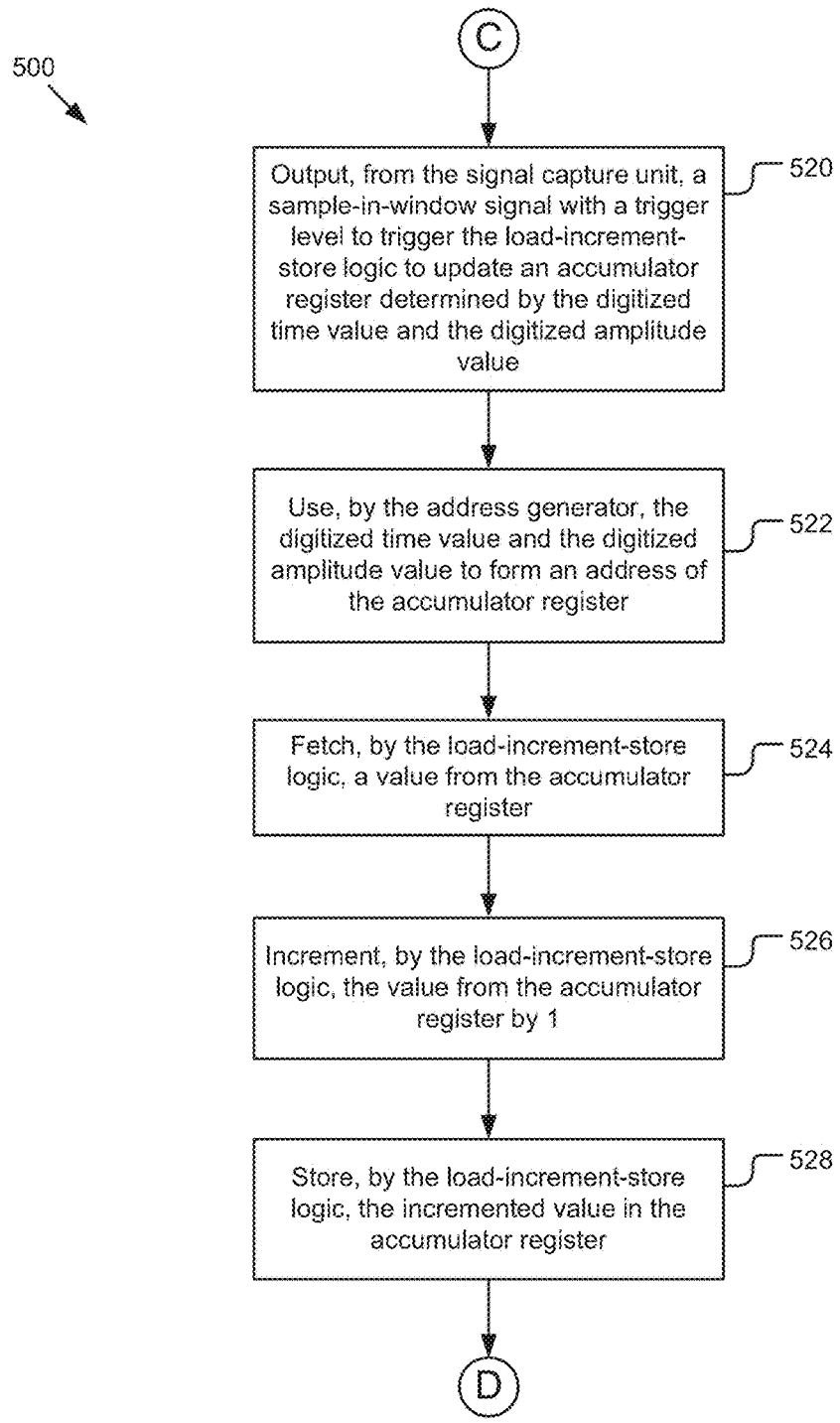

Referring to FIG. 5C, at block 520, a sample-in-window signal with a trigger level (e.g., a level of 1) may be outputted from the sample capture unit 415 of FIG. 4A (or the sample capture unit 452 of FIG. 4B) to trigger the load-increment-store logic 426 to update an accumulator register 423 determined by the digitized time value and the digitized amplitude value.

At block 522, the digitized time value and the digitized amplitude value may be used by the address generator 424 to form an address of the accumulator register 423. For example, the digitized time value may form a first sub-group of address bits for the address of the accumulator register 423, and the digitized amplitude value may form a second sub-group of address bits for the address of the accumulator register 423.

At block 524, a value stored in the accumulator register 423 may be fetched by the load-increment-store logic 426 using the address.

At block 526, the value from the accumulator register 423 may be incremented by the load-increment-store logic 426. For example, the load-increment-store logic 426 may increase the value by 1. In some embodiments, the load-increment-store logic 426 may clamp the value at a maximal value.

At block 528, the incremented value may be stored by the load-increment-store logic 426 to the accumulator register 423 using the address.

Figure 5D:
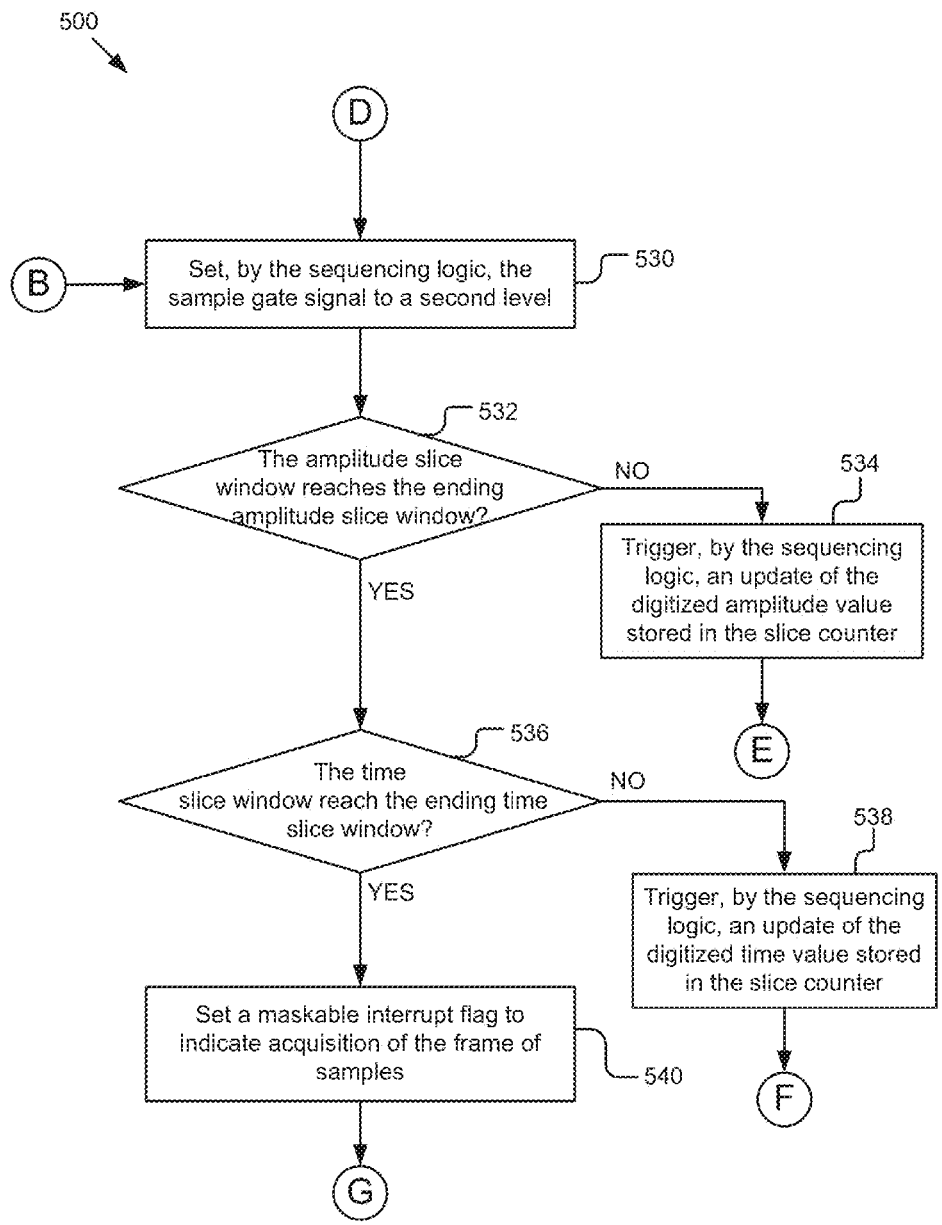

Referring to FIG. 5D, at block 530, the sample gate signal may be set to a second level (e.g., a level of 0) by the sequencing logic 430.

At block 532, the method 500 may include determining whether the amplitude slice window reaches the ending amplitude slice window. If the amplitude slice window reaches the ending amplitude slice window, the method 500 may proceed to block 536. Otherwise, the method 500 may proceed to block 534.

At block 534, an update of the digitized amplitude value stored in the slice counter may be triggered by the sequencing logic 430. For example, the sequencing logic 430 may set a next-time/amplitude-window signal to a trigger level to increase the amplitude slice value stored in the slice counter by 1, so that a next amplitude slice window may be used for sample acquisition. The method 500 may then return to block 512 of FIG. 5B.

At block 536, the method 500 may include determining whether the time slice window reaches the ending time slice window of the frame. If the time slice window reaches the ending time slice window, which may indicate that a frame of samples has been collected, the method 500 may proceed to block 540. Otherwise, the method 500 may proceed to block 538.

At block 538, an update of the digitized time value stored in the slice counter may be triggered by the sequencing logic 430. For example, the sequencing logic 430 may set a next-time/amplitude-window signal to a trigger level (e.g., a level of 1) to trigger an update of the digitized time value stored in the slice counter, so that the sample acquisition proceeds to a next time slice window. The method 500 may return to block 510 of FIG. 5A for capturing another sample in the next time slice window in the frame.

At block 540, a maskable interrupt flag may be set to indicate acquisition of the frame of samples. The method 500 may proceed to block 542 of FIG. 5E.

Figure 5E:
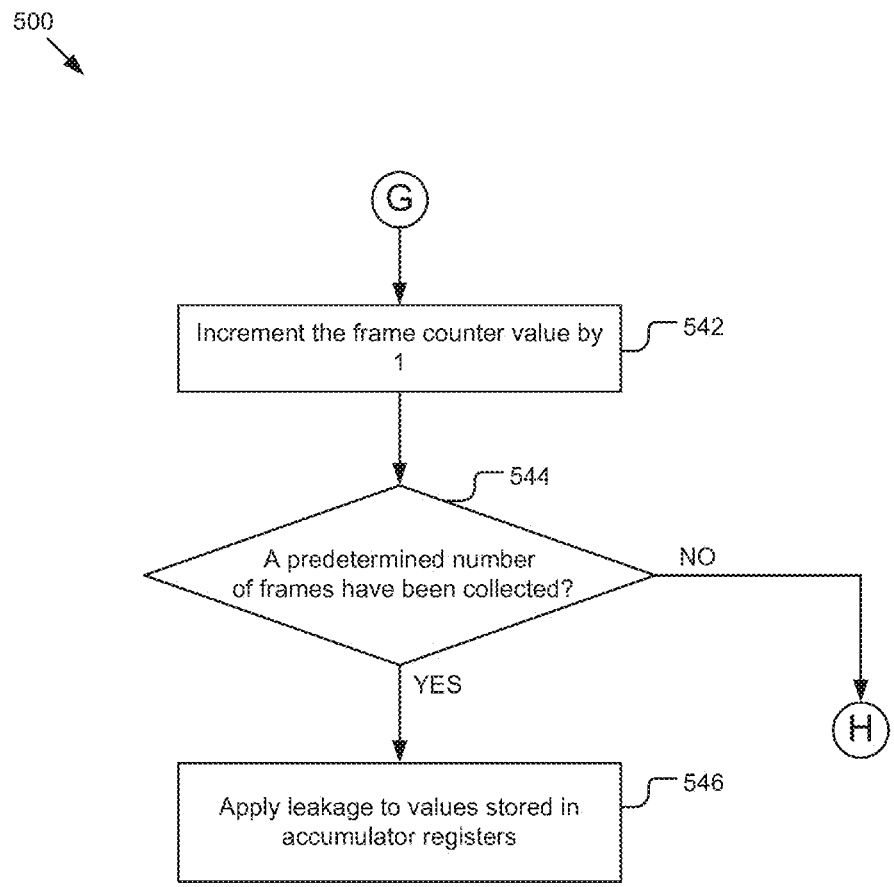

Referring to FIG. 5E, at block 542, the frame counter value may be incremented by 1 to indicate that the frame of samples has been acquired.

At block 544, the method 500 may include determining whether a predetermined number of frames have been collected. For example, the method 500 may include determining whether the frame counter value reaches the predetermined number of frames. If the predetermined number of frames have been collected, the method 500 may proceed to block 546. Otherwise, the method 500 may return to block 504 of FIG. 5A to continue collecting at least an additional frame of samples.

At block 546, leakage may be applied to values stored in accumulator registers 423. Alternatively or additionally, a trigger bit may be configured by a leakage system, a control system, or another suitable component or system to trigger execution of the leakage.

In some embodiments, a map of likelihood that the input signal may pass through each region determined by a corresponding amplitude slice window and a corresponding time slice window may be developed in a RAM array of accumulator registers 423. Values stored in the accumulator registers 423 may be retrieved and analyzed for eye quality metrics and PAM slice level adjustment. Multiple cycles may be run without resetting the accumulator registers 423 in order to accumulate sample readings in low density regions of the eye diagram.

Figure 6:
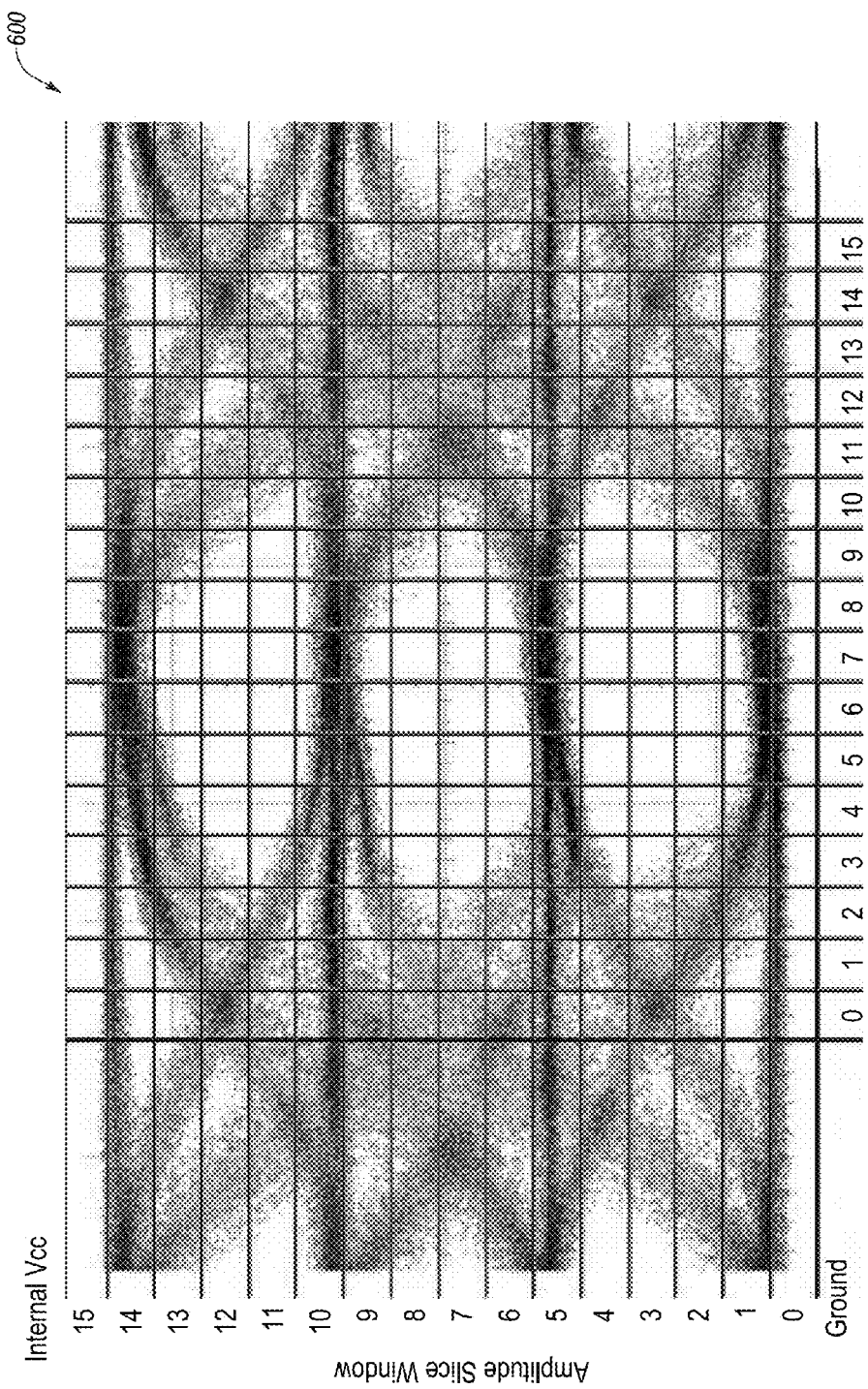
FIG. 6 is a graphic representation that illustrates example time slice windows and example amplitude slice windows for an eye diagram.

FIG. 6 is a graphic representation 600 that illustrates example time slice windows and example amplitude slice windows for an eye diagram, arranged in accordance with at least some embodiments described herein. The eye diagram may include a PAM-4 eye diagram.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An on-chip signal monitor comprising:
   a clock and data recovery (CDR) unit that provides a reference clock signal;
   a state machine that includes a sequencing logic, the sequencing logic configured to set a sample gate signal to a first level to initiate each sample acquisition, the sequencing logic configured to trigger an update of at least one of a digitized time value or a digitized amplitude value;
   a trigger flip flop that connects to the CDR unit to receive the reference clock signal and the sequencing logic to receive the sample gate signal, the trigger flip flop configured to pass a rising edge of the reference clock signal to an input of a programmable delay chain responsive to the sample gate signal being set to the first level;
   the programmable delay chain that receives the digitized time value and outputs a delayed rising edge to a sample capture unit at a time slice window determined by the digitized time value;
   the sample capture unit that, responsive to the delayed rising edge, captures a sample from an input signal within the time slice window and an amplitude slice window determined by the digitized amplitude value;
   an address generator that uses the digitized time value and the digitized amplitude value to form an address of an accumulator register located in a memory; and
   a load-increment-store logic that fetches a value of the accumulator register from the address of the memory, increments the value by 1, and stores the incremented value in the address.

2. The on-chip signal monitor of claim 1, wherein:
   an amplitude range of the input signal is discretized into N amplitude slice windows represented by $N^{1/2}$ bits;
   a time range of the input signal across a bit interval is discretized into M time slice windows represented by $M^{1/2}$ bits; and
   the memory includes N×M accumulator registers, wherein a corresponding accumulator register stores a value that represents a number of samples that fall within a corresponding amplitude slice window and a corresponding time slice window associated with the corresponding accumulator register.

3. The on-chip signal monitor of claim 1, further comprising a leakage system that implements leakage on values of accumulator registers located in the memory.

4. The on-chip signal monitor of claim 1, wherein the programmable delay chain includes:
   a first delay unit that adjusts a relative phase of the reference clock signal; and
   a second delay unit that is controlled by the sequencing logic through the digitized time value.

5. The on-chip signal monitor of claim 1, further comprising a counter that records at least one of the digitized time value or the digitized amplitude value, wherein the sequencing logic triggers the counter to update the at least one of the digitized time value or the digitized amplitude value.

6. An on-chip signal monitor comprising:
   a clock and data recovery (CDR) unit that provides a reference clock signal;
   a state machine that includes a sequencing logic, the sequencing logic configured to set a sample gate signal to a first level to initiate each sample acquisition, the sequencing logic configured to trigger an update of a digitized time value;
   a trigger flip flop that connects to the CDR unit to receive the reference clock signal and the sequencing logic to receive the sample gate signal, the trigger flip flop configured to pass a rising edge of the reference clock signal to an input of a programmable delay chain responsive to the sample gate signal being set to the first level;
   the programmable delay chain that receives the digitized time value and outputs a delayed rising edge to a sample-and-hold circuit at a time slice window determined by the digitized time value;
   a sample capture unit that includes:
      the sample-and-hold circuit that captures and integrates an input signal over the time slice window to output an average voltage of the input signal responsive to the delayed rising edge; and
      an analog-to-digital converter (ADC) that receives the average voltage of the input signal at the time slice window and digitizes the average voltage of the input signal to a digitized amplitude value;
   an address generator that uses the digitized time value and the digitized amplitude value to form an address of an accumulator register located in a memory; and
   a load-increment-store logic that fetches a value of the accumulator register from the address of the memory, increments the value by 1, and stores the incremented value in the address.

7. The on-chip signal monitor of claim 6, wherein:
   an amplitude range of the input signal is discretized into N amplitude slice windows represented by $N^{1/2}$ bits;
   a time range of the input signal across a bit interval is discretized into M time slice windows represented by $M^{1/2}$ bits; and
   the memory includes N×M accumulator registers, wherein a corresponding accumulator register stores a value that represents a number of samples that fall within a corresponding amplitude slice window and a corresponding time slice window associated with the corresponding accumulator register.

8. The on-chip signal monitor of claim 6, further comprising a leakage system that implements leakage on values of accumulator registers located in the memory.

9. The on-chip signal monitor of claim 6, wherein the programmable delay chain includes:
   a first delay unit that adjusts a relative phase of the reference clock signal; and
   a second delay unit that is controlled by the sequencing logic through the digitized time value.

10. The on-chip signal monitor of claim 6, further comprising a counter that records the digitized time value, wherein the sequencing logic triggers the counter to update the digitized time value.

11. An on-chip signal monitor comprising:
    a clock and data recovery (CDR) unit that provides a reference clock signal;

a state machine that includes a sequencing logic, the sequencing logic configured to set a sample gate signal to a first level to initiate each sample acquisition, the sequencing logic configured to trigger an update of a digitized time value and a digitized amplitude value;

a trigger flip flop that connects to the CDR unit to receive the reference clock signal and the sequencing logic to receive the sample gate signal, the trigger flip flop configured to pass a rising edge of the reference clock signal to an input of a programmable delay chain responsive to the sample gate signal being set to the first level;

the programmable delay chain that receives the digitized time value and outputs a delayed rising edge to a sample capture unit at a time slice window determined by the digitized time value;

the sample capture unit that, responsive to the delayed rising edge, captures a sample from an input signal if the sample is within the time slice window and an amplitude slice window determined by the digitized amplitude value;

an address generator that uses the digitized time value and the digitized amplitude value to form an address of an accumulator register located in a memory; and a load-increment-store logic that fetches a value of the accumulator register from the address of the memory, increments the value by 1, and stores the incremented value in the address.

12. The on-chip signal monitor of claim 11, wherein:
the amplitude slice window includes an upper threshold and a lower threshold, with the lower threshold equal to the digitized amplitude value;
the sample capture unit includes a lower comparator and an upper comparator, the lower comparator and the upper comparator configured to determine whether an amplitude of the input signal falls within the amplitude slice window at a time indicated by the time slice window; and
if the amplitude of the input signal falls within the amplitude slice window at the time indicated by the time slice window, the sample capture unit captures the sample within the time slice window and the amplitude slice window and outputs a sample-in-window signal with a trigger level to the load-increment-store logic.

13. The on-chip signal monitor of claim 11, wherein:
an amplitude range of the input signal is discretized into N amplitude slice windows represented by $N^{1/2}$ bits;
a time range of the input signal across a bit interval is discretized into M time slice windows represented by $M^{1/2}$ bits; and
the memory includes N×M accumulator registers, wherein a corresponding accumulator register stores a value that represents a number of samples that fall within a corresponding amplitude slice window and a corresponding time slice window associated with the corresponding accumulator register.

14. The on-chip signal monitor of claim 11, further comprising a leakage system that implements leakage on values of accumulator registers located in the memory.

15. The on-chip signal monitor of claim 11, wherein the programmable delay chain includes:
a first delay unit that adjusts a relative phase of the reference clock signal; and
a second delay unit that is controlled by the sequencing logic through the digitized time value.

16. The on-chip signal monitor of claim 11, further comprising a counter that records at least one of the digitized time value or the digitized amplitude value, wherein the sequencing logic triggers the counter to update the at least one of the digitized time value or the digitized amplitude value.

17. A method of acquiring samples using an automatic signal monitor, the method comprising:
setting a sample gate signal to a first level to initiate sample acquisition;
capturing an input signal over a time slice window to output an average voltage of the input signal in the time slice window, wherein the time slice window is determined by a digitized time value stored in a counter;
digitizing the average voltage of the input signal to a digitized amplitude value;
forming an address of an accumulator register based on the digitized time value and the digitized amplitude value;
fetching a value stored in the accumulator register using the address;
incrementing the value by 1; and
storing the value in the accumulator register.

18. The method of claim 17, further comprising:
configuring a starting time slice window and an ending time slice window for a frame of samples; and
initializing the time slice window with the starting time slice window.

19. The method of claim 18, further comprising:
determining whether the time slice window reaches the ending time slice window; and
if the time slice window does not reach the ending time slice window:
triggering an update of the digitized time value stored in the counter to determine a next time slice window;
capturing the input signal over the next time slice window to output a second average voltage of the input signal in the next time slice window;
digitizing the second average voltage of the input signal to a second digitized amplitude value;
forming a second address of a second accumulator register based on the updated digitized time value and the second digitized amplitude value;
fetching a second value stored in the second accumulator register using the second address;
incrementing the second value by 1; and
storing the second value in the second accumulator register.

20. The method of claim 19, further comprising, if the time slice window reaches the ending time slice window:
setting a maskable interrupt flag to indicate acquisition of the frame of samples; and
incrementing a frame counter value by 1.

21. The method of claim 17, further comprising applying leakage to values stored in accumulator registers.

22. A method of acquiring samples using an automatic signal monitor, the method comprising:
setting a sample gate signal to a first level to initiate sample acquisition;
capturing a sample within a time slice window determined by a digitized time value and an amplitude slice window determined by a digitized amplitude value, wherein the digitized time value and the digitized amplitude value are stored in a counter;
generating a sample-in-window signal with a trigger level to trigger an update of an accumulator register determined by the digitized time value and the digitized amplitude value;

forming an address of the accumulator register based on the digitized time value and the digitized amplitude value;
fetching a value stored in the accumulator register using the address;
incrementing the value by 1; and
storing the value in the accumulator register.

23. The method of claim 22, further comprising:
configuring a starting time slice window and an ending time slice window for a frame of samples;
configuring a starting amplitude slice window and an ending amplitude slice window for the frame of samples;
initializing the time slice window with the starting time slice window; and
initializing the amplitude slice window with the starting amplitude slice window.

24. The method of claim 23, further comprising:
determining whether the amplitude slice window reaches the ending amplitude slice window;
if the amplitude slice window does not reach the ending amplitude slice window:
   triggering an update of the digitized amplitude value stored in the counter to determine a next amplitude slice window;
   capturing a second sample within the time slice window and the next amplitude slice window;
   forming a second address of a second accumulator register based on the digitized time value and the second digitized amplitude value;
   fetching a second value stored in the second accumulator register using the second address;
   incrementing the second value by 1; and
   storing the second value in the second accumulator register; or
if the amplitude slice window reaches the ending amplitude slice window:
   triggering an update of the digitized time value stored in the counter to determine a next time slice window; and
   capturing samples associated with the next time slice window for the frame of samples.

25. The method of claim 24, further comprising:
determining whether the time slice window reaches the ending time slice window;
if the time slice window does not reach the ending time slice window:
   triggering an update of the time slice window; and
   continuing to capture samples associated with the updated time slice window for the frame of samples; or
if the time slice window reaches the ending time slice window:
   setting a maskable interrupt flag to indicate acquisition of the frame of samples; and
   incrementing a frame counter value by 1.

\* \* \* \* \*